United States Patent
Young

(10) Patent No.: US 10,610,870 B2
(45) Date of Patent: Apr. 7, 2020

(54) HOT AND COLD FORMING HAMMER AND METHOD OF ASSEMBLY

(71) Applicant: Roger Young, Rock Falls, IL (US)

(72) Inventor: Roger Young, Rock Falls, IL (US)

(73) Assignee: Bliss Industries, LLC, Ponca City, OK (US)

(*) Notice: Subject to any disclaimer, the term of this patent is extended or adjusted under 35 U.S.C. 154(b) by 0 days.

(21) Appl. No.: 16/267,164

(22) Filed: Feb. 4, 2019

(65) Prior Publication Data
US 2019/0168228 A1    Jun. 6, 2019

Related U.S. Application Data

(63) Continuation-in-part of application No. 15/912,056, filed on Mar. 5, 2018, now Pat. No. 10,207,274.
(Continued)

(51) Int. Cl.
| | |
|---|---|
| *B02C 13/28* | (2006.01) |
| *B23K 9/173* | (2006.01) |
| *B23K 101/20* | (2006.01) |

(52) U.S. Cl.
CPC .............. *B02C 13/28* (2013.01); *B23K 9/173* (2013.01); *B23K 2101/20* (2018.08)

(58) Field of Classification Search
CPC . B21D 5/01; B21D 5/02; B21D 5/008; B21D 5/16; B21D 37/16; B21D 39/02;
(Continued)

(56) References Cited

U.S. PATENT DOCUMENTS

| | | |
|---|---|---|
| 758,288 A | 4/1904 | Williams |
| 858,772 A | 7/1907 | Williams |
| (Continued) | | |

FOREIGN PATENT DOCUMENTS

| | | |
|---|---|---|
| CA | 2613956 A1 | 2/2009 |
| CA | 2720159 A1 | 5/2011 |
| (Continued) | | |

OTHER PUBLICATIONS

Genesis III, Inc., "Hammer Mill Hammers", http://h3hammers.com/hammer-mill-parts/hammer-mill-hammers/#forged, pp. 1-14, accessed on Dec. 7, 2017.
(Continued)

*Primary Examiner* — Teresa M Ekiert
(74) *Attorney, Agent, or Firm* — McKee, Voorhees & Sease, PLC

(57) ABSTRACT

Methods for manufacturing improved free-swinging hammermill hammer configurations are disclosed and described and include steps commonly associated with one or more processes selected from the group of hot working, cold working, and MIG welding. The free-swinging hammermill hammer configurations are for comminution of materials such as grain and refuse. The hammer configurations of the present disclosure are adaptable to most hammer mill or grinders having free-swinging systems. The improved configurations improve installing, removing, and cleaning hammer components within the hammermill. Additionally, the hammer configurations of the present disclosure improve the overall efficiency of the hammermill during operation.

6 Claims, 37 Drawing Sheets

Related U.S. Application Data

(60) Provisional application No. 62/595,291, filed on Dec. 6, 2017, provisional application No. 62/579,469, filed on Oct. 31, 2017, provisional application No. 62/548,180, filed on Aug. 21, 2017.

(58) Field of Classification Search
CPC ........ B21D 28/24; B21D 28/26; B21D 28/32; B21C 37/02; B21B 47/02; B02C 13/28
See application file for complete search history.

(56) References Cited

U.S. PATENT DOCUMENTS

| | | |
|---|---|---|
| 906,364 A | 12/1908 | Backus |
| 1,016,979 A | 2/1912 | Williams |
| 1,041,495 A | 10/1912 | Liggett et al. |
| 1,085,692 A | 2/1914 | Liggett |
| 1,266,894 A | 5/1918 | Williams |
| RE14,865 E | 5/1920 | Plaisted |
| RE14,920 E | 7/1920 | Morse et al. |
| 1,433,042 A | 10/1922 | Sedberry |
| 1,444,990 A | 2/1923 | Wauthier |
| 1,630,021 A | 5/1927 | Lucas |
| 1,678,723 A | 7/1928 | Clement |
| 1,693,058 A | 11/1928 | Shelton |
| 1,759,905 A | 5/1930 | Keith |
| 1,760,097 A | 5/1930 | Williams |
| 1,761,038 A | 6/1930 | Harley |
| 1,787,526 A | 1/1931 | Honstain |
| 1,821,912 A | 9/1931 | Pfeiffer |
| 1,827,986 A | 10/1931 | Iglehart |
| 1,829,325 A | 10/1931 | Alfred |
| 1,854,844 A | 4/1932 | Kaemmerling |
| 1,889,129 A | 11/1932 | Nielsen |
| 1,911,718 A | 5/1933 | Saunders |
| 1,927,986 A | 9/1933 | Levy |
| 1,947,784 A | 2/1934 | Armstrong |
| 1,954,175 A | 4/1934 | Jensen |
| 1,997,553 A | 4/1935 | Taylor, Jr. et al. |
| 2,015,581 A | 9/1935 | Armour |
| 2,207,455 A | 7/1940 | Clement |
| 2,237,510 A | 4/1941 | Tankersley |
| 2,244,577 A | 6/1941 | Schreiber |
| 2,404,775 A | 6/1946 | Ehmann |
| 2,404,778 A | 7/1946 | Allison |
| 2,460,279 A | 2/1949 | Ehmann |
| 2,531,597 A | 11/1950 | Anderson |
| 2,566,758 A | 9/1951 | Anderson |
| 2,566,798 A | 9/1951 | Hiller |
| 2,602,597 A | 7/1952 | Ball |
| 2,607,538 A | 8/1952 | Larson |
| 2,763,439 A | 9/1956 | Mankoff |
| 3,022,018 A | 2/1962 | Knight |
| 3,045,934 A | 7/1962 | Eilers |
| 3,058,676 A | 10/1962 | Hermann |
| 3,222,854 A | 12/1965 | Barth |
| 3,278,126 A | 10/1966 | Ratkowski |
| 3,322,356 A | 5/1967 | Toews |
| 3,379,383 A | 4/1968 | Stepanek |
| 3,453,855 A * | 7/1969 | Morita ................. B21D 53/886 72/296 |
| 3,471,093 A | 10/1969 | Wienert |
| 3,482,789 A | 12/1969 | Newell |
| 3,549,095 A | 12/1970 | Ratkowski |
| 3,598,008 A | 8/1971 | Jacobson et al. |
| 3,627,212 A | 12/1971 | Stanton |
| 3,682,401 A | 8/1972 | Jacobson et al. |
| 3,738,586 A | 6/1973 | Fabert, Jr. |
| 3,966,126 A | 6/1976 | Werner |
| 3,966,128 A | 6/1976 | Anderson et al. |
| 3,979,078 A | 9/1976 | Boddeker et al. |
| 3,995,816 A | 12/1976 | Motek |
| 3,997,121 A | 12/1976 | Motek |
| 4,000,859 A | 1/1977 | Whitney |
| 4,106,706 A | 8/1978 | Burrows |
| 4,129,262 A | 12/1978 | Lowry |
| 4,134,554 A | 1/1979 | Morlock |
| 4,141,512 A | 2/1979 | Francis |
| 4,142,687 A | 3/1979 | Potwin |
| 4,162,767 A | 7/1979 | Hahn |
| 4,166,583 A | 9/1979 | Ruckstuhl |
| 4,177,956 A | 12/1979 | Fawcett |
| 4,202,504 A | 5/1980 | Cameron |
| 4,310,125 A | 1/1982 | Novotny |
| 4,313,575 A | 2/1982 | Stepanek |
| 4,341,353 A | 7/1982 | Hamilton et al. |
| 4,343,438 A | 8/1982 | Slikas et al. |
| 4,352,774 A | 10/1982 | Hornberger |
| 4,406,415 A | 9/1983 | Greer |
| 4,519,551 A | 5/1985 | Ceurvorst |
| 4,558,826 A | 12/1985 | Martinek |
| 4,729,516 A | 3/1988 | Williams, Jr. |
| 4,795,103 A | 1/1989 | Lech |
| 4,856,170 A | 8/1989 | Kachik |
| 4,907,750 A | 3/1990 | Seifert |
| 4,915,310 A | 4/1990 | Stelk |
| 5,002,233 A | 3/1991 | Williams |
| 5,072,888 A | 12/1991 | Stelk |
| 5,169,077 A | 12/1992 | Stelk |
| 5,207,391 A | 5/1993 | Anderson |
| 5,320,292 A | 6/1994 | Smith |
| 5,364,038 A | 11/1994 | Prew |
| 5,377,919 A | 1/1995 | Rogers et al. |
| 5,381,975 A | 1/1995 | Chon et al. |
| 5,443,216 A | 8/1995 | Lajoie |
| 5,465,912 A | 11/1995 | Graybill et al. |
| 5,570,849 A | 11/1996 | Anderson |
| 5,605,291 A | 2/1997 | Doskocil |
| 5,611,496 A | 3/1997 | Fleenor |
| 5,628,467 A | 5/1997 | Graveman |
| 5,692,688 A | 12/1997 | Waltman et al. |
| 5,722,607 A | 3/1998 | Hellmich |
| 5,735,163 A * | 4/1998 | Sato .................... B21D 22/201 72/348 |
| 5,842,653 A | 12/1998 | Elliott et al. |
| 5,904,306 A | 5/1999 | Elliott et al. |
| 5,984,216 A | 11/1999 | Andela et al. |
| 6,045,072 A | 4/2000 | Zehr |
| 6,131,838 A | 10/2000 | Balvanz et al. |
| 6,142,400 A | 11/2000 | Balvanz et al. |
| 6,260,778 B1 | 7/2001 | Wenger |
| 6,299,082 B1 | 10/2001 | Smith |
| 6,364,227 B1 | 4/2002 | Dorscht |
| 6,394,375 B1 | 5/2002 | Balvanz et al. |
| 6,394,378 B1 | 5/2002 | Ragnarsson |
| 6,419,173 B2 | 7/2002 | Balvanz et al. |
| 6,464,157 B1 | 10/2002 | Balvanz et al. |
| 6,481,654 B1 | 11/2002 | Balvanz et al. |
| 6,494,394 B1 | 12/2002 | Balvanz et al. |
| 6,517,020 B1 | 2/2003 | Smith |
| 6,520,440 B2 | 2/2003 | Ragnarsson |
| 6,550,302 B1 * | 4/2003 | Ghosh ................... B21D 37/16 72/342.7 |
| 6,622,951 B1 | 9/2003 | Recker et al. |
| 6,971,598 B2 | 12/2005 | Schillinger et al. |
| 7,140,569 B2 | 11/2006 | Young |
| D536,350 S | 2/2007 | Young |
| D536,351 S | 2/2007 | Young |
| D536,352 S | 2/2007 | Young |
| D544,503 S | 6/2007 | Young |
| D544,504 S | 6/2007 | Young |
| D545,327 S | 6/2007 | Young |
| D545,328 S | 6/2007 | Young |
| D545,846 S | 7/2007 | Young |
| D545,847 S | 7/2007 | Young |
| D550,728 S | 9/2007 | Young |
| D551,266 S | 9/2007 | Young |
| D551,267 S | 9/2007 | Young |
| D552,638 S | 10/2007 | Willibald |
| D552,639 S | 10/2007 | Young |
| D555,679 S | 11/2007 | Young |
| 7,325,761 B2 | 2/2008 | Chen et al. |
| D573,163 S | 7/2008 | Young |
| 7,419,109 B1 | 9/2008 | Ronfeldt et al. |

(56) References Cited

U.S. PATENT DOCUMENTS

| | | | |
|---|---|---|---|
| D588,174 S | 3/2009 | Young | |
| 7,559,497 B2 | 7/2009 | Young | |
| 7,621,477 B2 | 11/2009 | Young | |
| D616,002 S | 5/2010 | Willibald | |
| 7,819,352 B2 | 10/2010 | Young | |
| D637,633 S | 5/2011 | Young et al. | |
| 8,033,490 B1 | 10/2011 | Young et al. | |
| 8,613,403 B1 | 12/2013 | Young | |
| 8,708,263 B2 | 4/2014 | Young et al. | |
| 8,800,903 B1 | 8/2014 | Young | |
| 8,960,581 B1 | 2/2015 | Young | |
| 8,998,120 B1 | 4/2015 | Young | |
| 9,358,546 B1 | 6/2016 | Young | |
| 9,566,584 B2 | 2/2017 | Young et al. | |
| 2002/0190148 A1 | 12/2002 | Roozeboom et al. | |
| 2004/0017955 A1 | 1/2004 | Schillinger et al. | |
| 2006/0032958 A1 | 2/2006 | Young | |
| 2007/0023554 A1 | 2/2007 | Young | |
| 2009/0321546 A1 | 12/2009 | Plumb et al. | |
| 2010/0025511 A1 | 2/2010 | Young | |
| 2010/0090047 A1 | 4/2010 | Wilibald | |
| 2010/0213301 A1 | 8/2010 | Hoice et al. | |
| 2011/0042498 A1 | 2/2011 | Young et al. | |
| 2015/0027602 A1* | 1/2015 | Murakami | B21D 37/16 148/653 |
| 2016/0243554 A1 | 8/2016 | Young | |

FOREIGN PATENT DOCUMENTS

| | | |
|---|---|---|
| DE | 10215833 A1 | 11/2003 |
| EP | 1444990 A1 | 8/2004 |

OTHER PUBLICATIONS

Rightway Manufacturing, "Hammers", http://www.rwmfginc.com/products.aspx?gs=1, pp. 1-3. Oct. 19, 2017.

Watson, Stanley A. & Paul E. Ramstad, eds. (Corn: Chemistry and Technology, American Association of Cereal Chemist, Inc., St. Paul, Minn.), Chapter 11—Alexander, Richard J., "Corn Dry Milling: Processes, Products, and Applications", pp. 351-376. 1987.

Postalloy® Tungsten Carbide Hardfacing Products, "Tungsten Carbide Hardfacing", http://tungstencarbidehardfacing.com/tungstencarbidehardfacing/index_tchf.php, pp. 1-4. Nov. 12, 2017.

"MIG Welding: The Basics for Mild Steel", http://www.millerwelds.com/resources/article-library/mig-welding-the-basics-for-mild-steel, pp. 1-9. Nov. 12, 2017.

"Jacobs Pentagon XTREME Hammer System", https://www.jacobscorp.com/t-pentagon.aspx, accessby by Applicant in 2018.

* cited by examiner

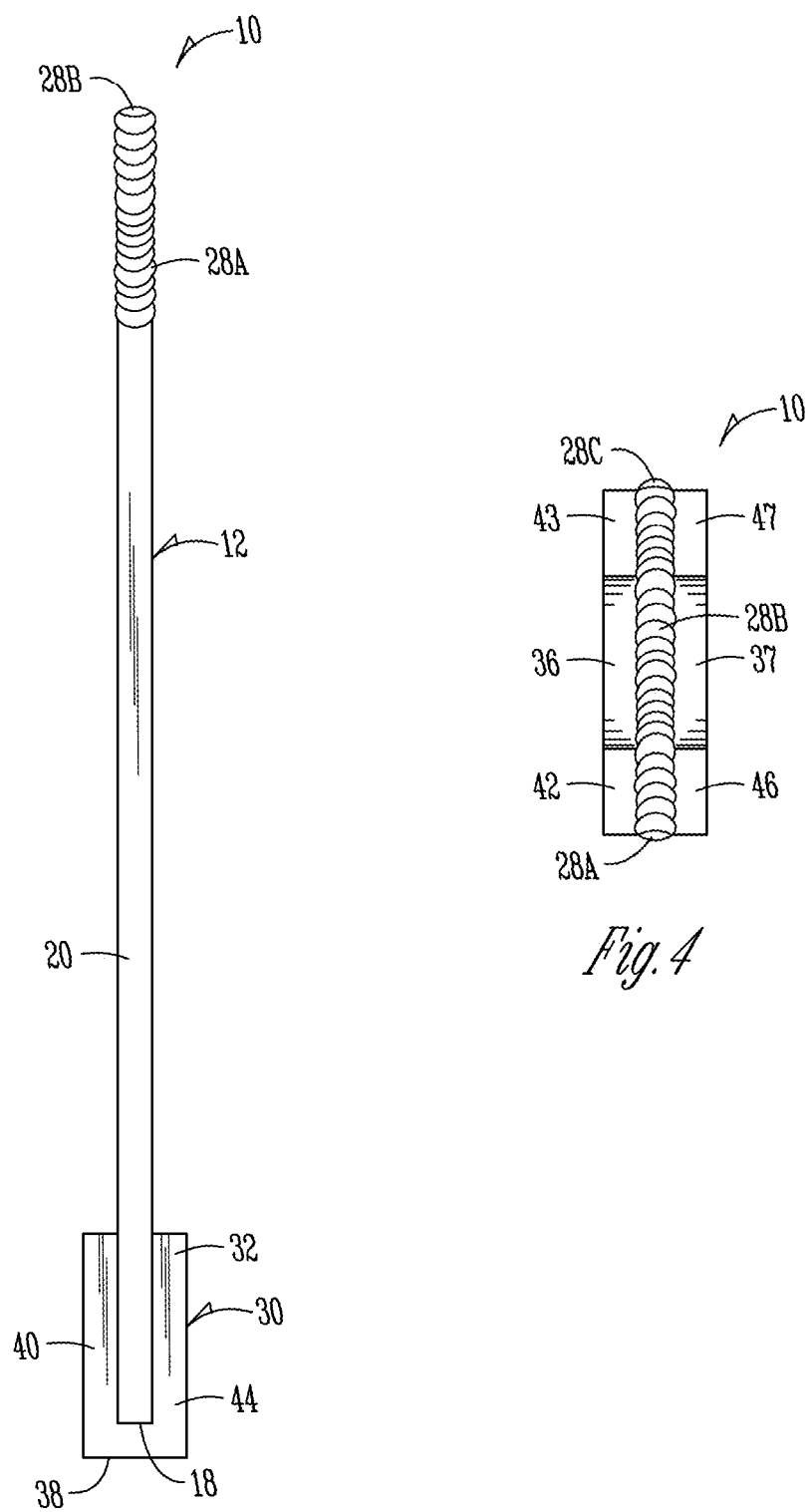

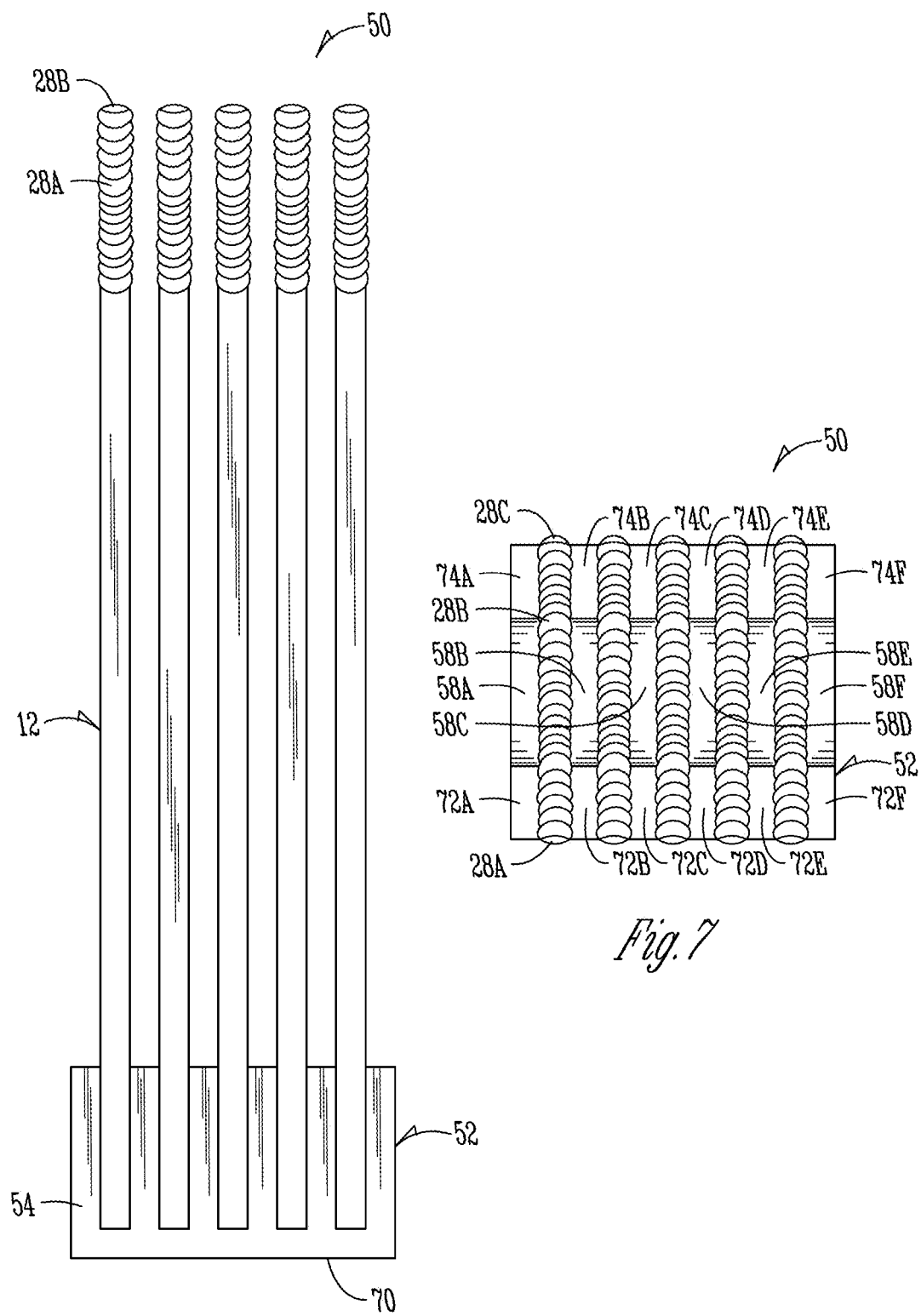

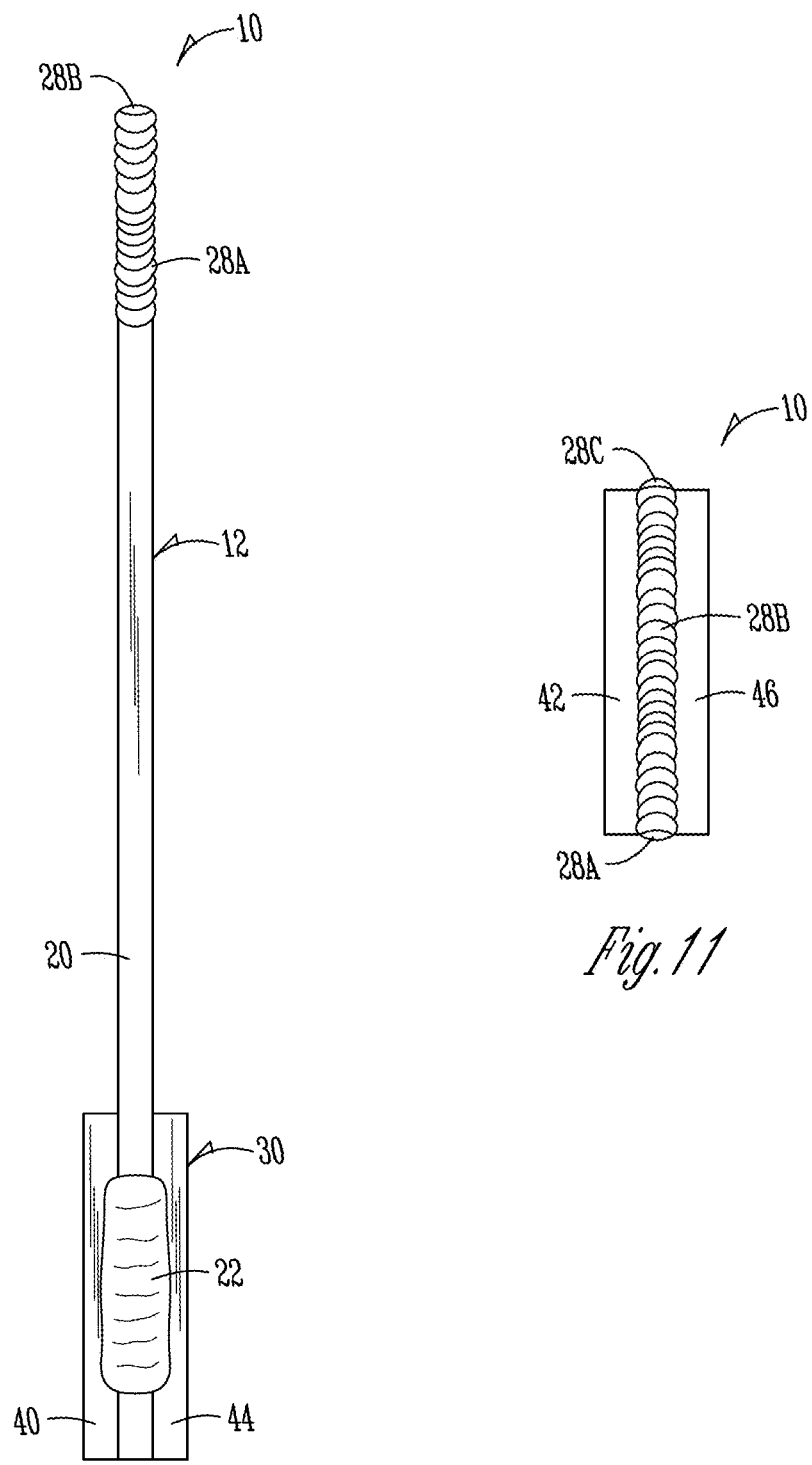

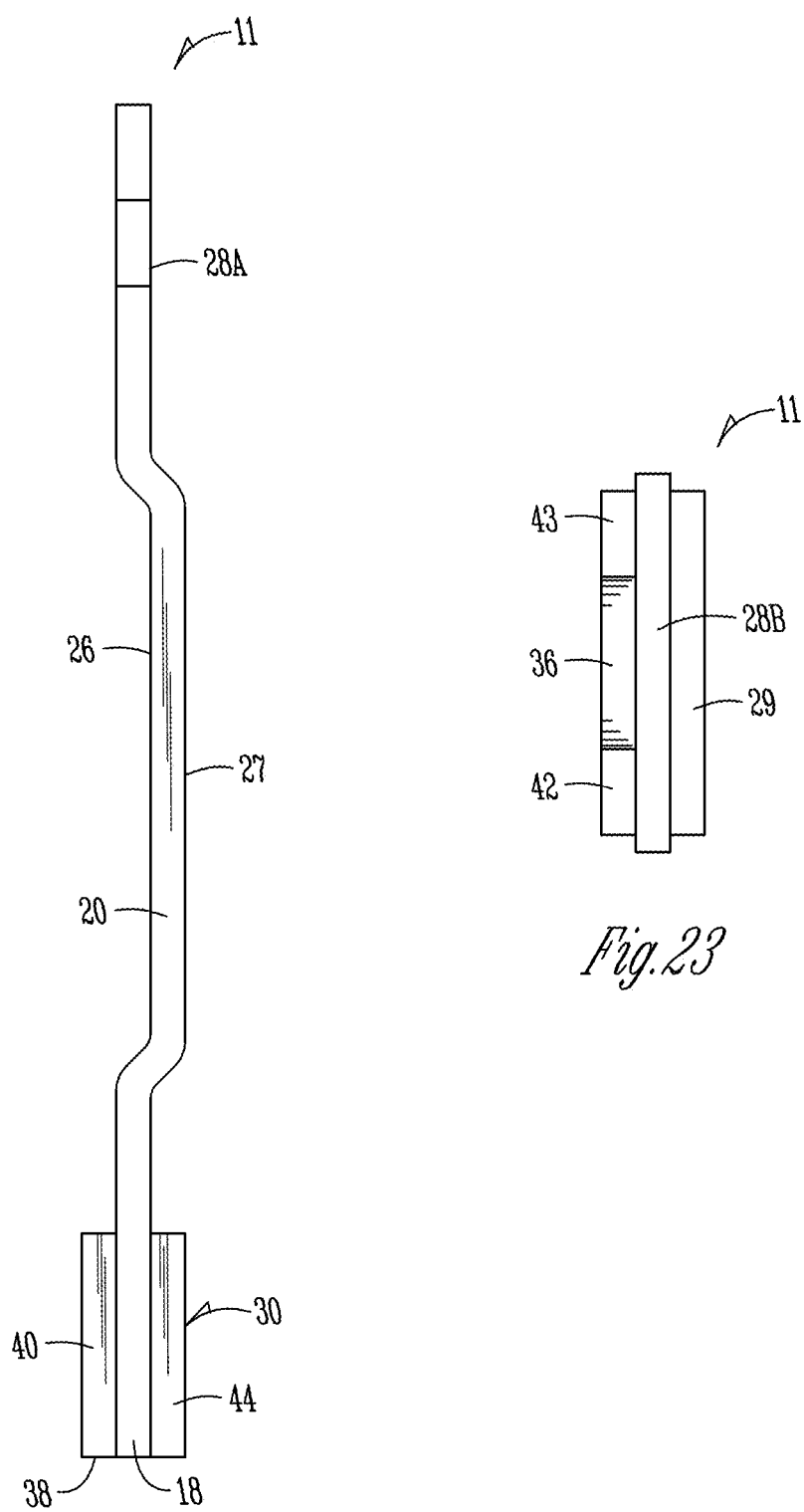

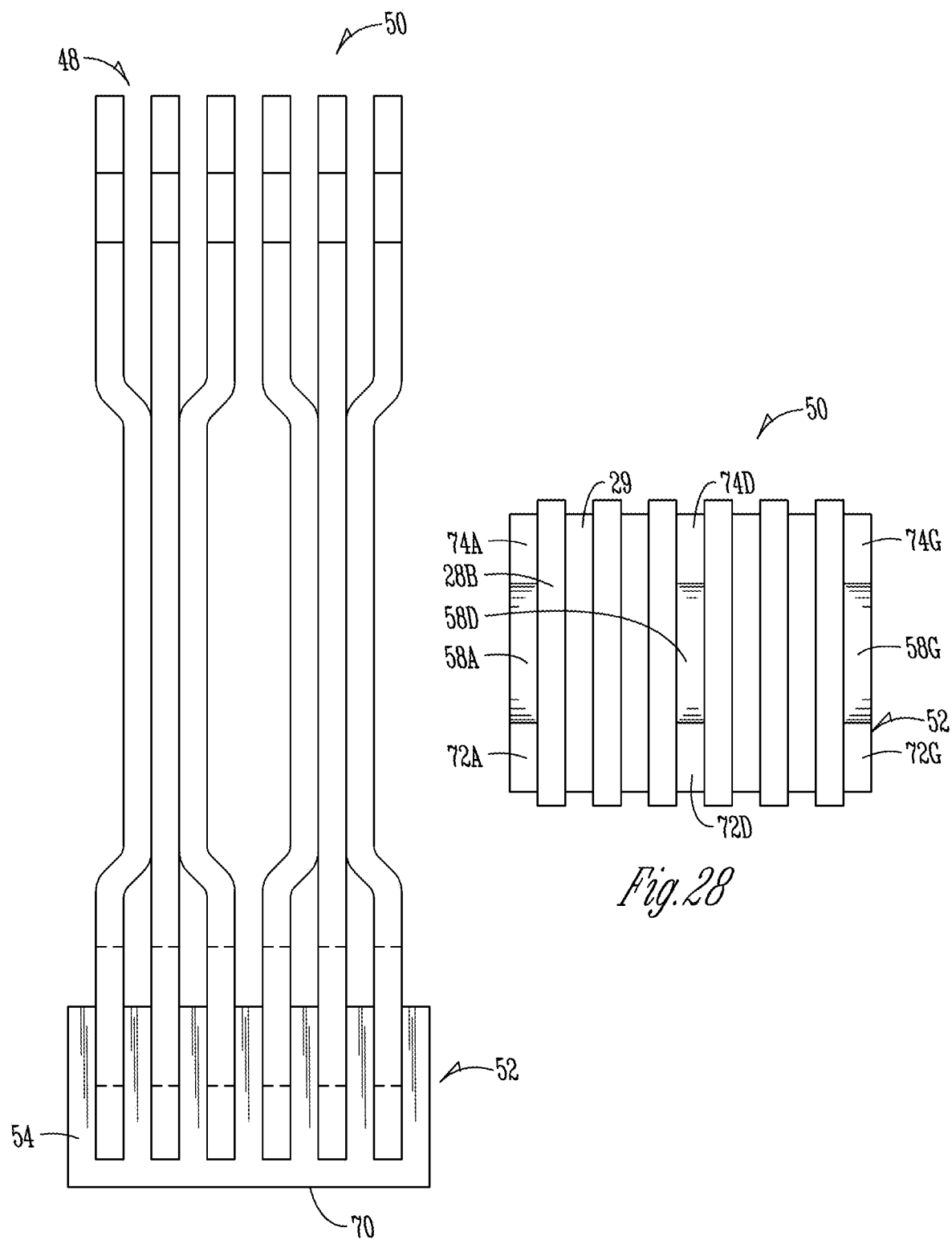

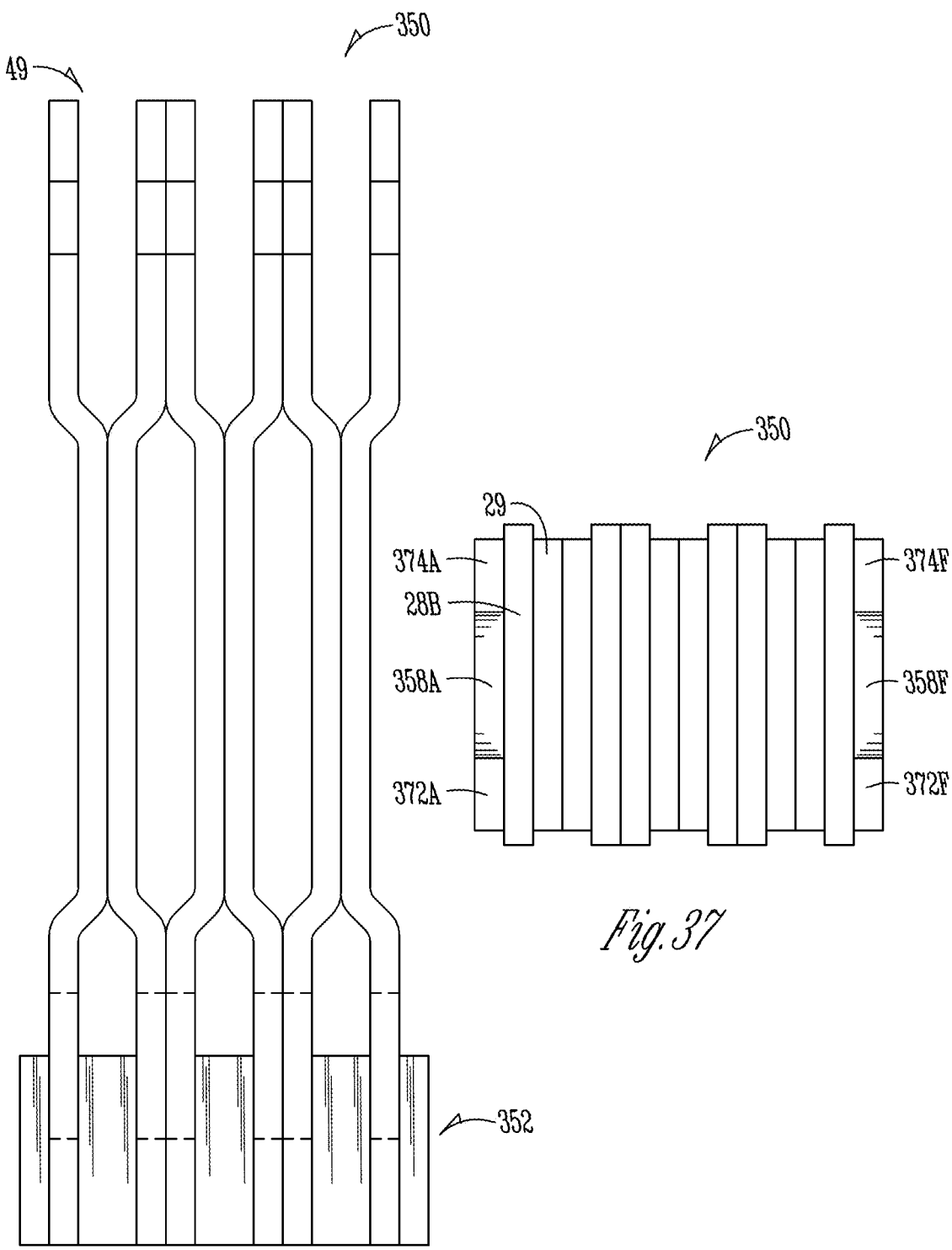

HOT AND COLD FORMING HAMMER AND METHOD OF ASSEMBLY

CROSS REFERENCE TO RELATED APPLICATIONS

This is a continuation-in-part application which claims priority under 35 U.S.C. § 120 to U.S. Ser. No. 15/912,056, filed Mar. 5, 2018. The parent application, U.S. Ser. No. 15/912,056, claimed priority under 35 U.S.C. § 119 to provisional patent applications U.S. Ser. No. 62/595,291, filed Dec. 6, 2017, U.S. Ser. No. 62/579,469, filed Oct. 31, 2017, and U.S. Ser. No. 62/548,180, filed Aug. 21, 2017. All of these applications are herein incorporated by reference in their entirety, including without limitation, the specification, claims, and abstract, as well as any figures, tables, appendices, or drawings thereof.

FIELD OF THE INVENTION

The invention relates generally to non-forged rotary hammermill hammers.

BACKGROUND OF THE INVENTION

U.S. Pat. Nos. 7,140,569 and 7,621,477, which are both incorporated by reference in their entirety herein and are both to Young, note several industries rely on impact grinders or hammermills to reduce materials to a smaller size. For example, hammermills are often used to process forestry, agricultural products, and minerals and to recycle materials. Materials processed by hammermills include grains, animal food, pet food, food ingredients, mulch, and bark.

Whole grain corn must be cracked before further processing and may be cracked after tempering yet before conditioning. Particle size reduction may be accomplished with a hammermill including successive rows of rotating hammer like devices spinning on a common rotor next to one another comminute the grain product. Several methods for size reduction as applied to grain and animal products are described in Watson, S. A. & P. E. Ramstad, ed. (1987, Corn: Chemistry and Technology, Chapter 11, American Association of Cereal Chemist, Inc., St. Paul, Minn.), the disclosure of which is hereby incorporated by reference in its entirety.

Hammermills may also be generally referred to as crushers and typically include a steel housing or chamber containing a plurality of hammers mounted on a rotor and a suitable drive train for rotating the rotor. As the rotor turns, the correspondingly rotating hammers come into engagement with the material to be comminuted or reduced in size. Hammermills typically use screens formed into and circumscribing a portion of the interior surface of the housing. The size of the particulate material is controlled by the size of the screen apertures against which the rotating hammers force the material. Exemplary embodiments of hammermills are disclosed in U.S. Pat. Nos. 5,904,306; 5,842,653; 5,377,919; and 3,627,212, which are all incorporated herein.

Swinging hammers with blunt edges are typically better suited for processing "dirty" products, or products containing metal or stone contamination. The rotatable hammers of a hammermill may recoil backwardly if the hammer cannot break or push the material on impact. Even though a hammermill is designed to better handle the entry of a "dirty" products, there still exists a possibility for catastrophic failure of a hammer causing severe damage to the hammermill and requiring immediate maintenance and repairs.

Treatment methods such as adding weld material to the end of the hammer blade improve the comminution properties of the hammer. These methods typically infuse the hammer edge, through welding, with a metallic material resistant to abrasion or wear such as tungsten carbide. See for example U.S. Pat. No. 6,419,173, incorporated herein by reference, describing methods of attaining hardened hammer tips or edges as are well known in the prior art by those practiced in the arts.

Hammers are typically singular units and are not rigidly secured together. For example, as is shown in FIGS. 1-4 of U.S. Pat. No. 7,140,569, the hammers may be slid onto a drive shaft and spacers are placed in between each hammer. This configuration presents many potential gaps, all of which are exposed to debris, thereby creating excessive or premature wear. It is therefore desirable to minimize the number of parts and the corresponding number of gaps to extend the life of the hammer assembly.

The use of separate hammers and spacers also presents removal and installation difficulties. While some parts may be keyed to the drive shaft, flying debris can dent or damage parts thereby making removal or installation difficult. The increased number of parts also complicates the assembly/disassembly process. Thus, there is a need in the art to simplify the installation and replacement process and to minimize the number of parts being replaced.

The four metrics of strength, capacity, run time, and the amount of force delivered are typically considered by users of hammermill hammers to evaluate any hammer to be installed in a hammermill. A hammer to be installed is first evaluated on its strength. Typically, hammermill machines employing hammers of this type are operated twenty-four hours a day, seven days a week. This punishing environment requires strong and resilient material that will not prematurely or unexpectedly deteriorate. Next, the hammer is evaluated for capacity, or more specifically, how the weight of the hammer affects the capacity of the hammermill. The heavier the hammer, the fewer hammers that may be used in the hammermill by the available horsepower. A lighter hammer increases the number of hammers that may be mounted within the hammermill for the same available horsepower. More force delivered by the hammer to the material to be comminuted against the screen increases effective comminution (e.g. cracking or breaking down of the material) and efficiency of the comminution process. The force delivered is evaluated with respect to the weight of the hammer. Finally, the longer the hammer lasts, the longer the machine is able to run, resulting in larger profits presented by continuous processing of the material in the hammermill through reduced maintenance costs and lower necessary capital inputs. The four metrics are interrelated and typically tradeoffs are necessary to improve performance. For example, to increase the amount of force delivered, the weight of the hammer could be increased. However, because the weight of the hammer increased, the capacity of the unit typically will be decreased because of horsepower limitations. There is a need in the art to improve upon the design of hammermill hammers available in the prior art for optimization of the four (4) metrics listed above.

BRIEF SUMMARY OF THE INVENTION

Therefore, it is an object, feature, or advantage of the present invention to utilize a saddle or a hammer mouth which accommodates a hammer body or multiple hammer bodies.

Another object, feature, or advantage of the present invention is to improve the securement end of free-swinging hammers for use in hammer mills.

Another object, feature, or advantage of the present invention is to provide a hammer that is easily installed and removed.

Another object, feature, or advantage of the present invention is to improve the durability and operational run-time of hammermill hammers.

Another object, feature, or advantage of the present invention is to provide hammers having hardened edges by such means as welding or heat treating.

Another object, feature, or advantage of the present invention is to provide a hammer allowing for improved projection of momentum to the hammer blade tip to thereby increase the delivery of force to comminution materials.

Another object, feature, or advantage of the present invention is to provide a cost-effective hammer.

Another object, feature, or advantage of the present invention is to provide an aesthetically pleasing hammer.

Another object, feature, or advantage of the present invention is to provide hammers that improve the safety of the operator of a hammermill.

These or other objects, features, and advantages of the invention will be apparent to those skilled in the art. The invention is not to be limited to or by these objects, features and advantages. No single embodiment need provide each and every object, feature, or advantage.

According to some aspects of the present disclosure, an improved, non-forged hammer for use in a rotatable hammermill assembly is provided and comprises a hammer body. The hammer body includes a hammer body front surface, a first end for securement within a saddle or a hammer mouth, a first rod hole, and a second end for contact and delivery of momentum to material to be comminuted, wherein said second end has a weld hardened edge. A saddle secured to the hammer body may be secured to the hammer body. The saddle may include a bottom surface, a saddle front surface, a first fender extending upwardly from the bottom surface to a first top fender edge, the first top fender edge being parallel to the bottom surface, a second fender extending upwardly from the bottom surface to a second top fender edge, the second top fender edge being parallel to the bottom surface, and a second rod hole aligned with the first rod hole such that a hammermill rod can pass through the first and second rod holes.

According to other aspects of the invention, the non-forged hammer includes a weld hardened edge welded to the periphery of the second end. The weld hardened edge has two side contact edges opposite one another that partially cover the first and second hammer body edges, a top contact edge, and tungsten carbide for increased hardness.

According to other aspects of the disclosure, the hammer body is a non-planar hammer body and comprises a recessed surface and a protruding surface located opposite the recessed surface. The non-forged hammer may include two side contact edges opposite one another that partially cover the first and second hammer body edges, recessed edges between the recessed surface and the hammer body front surface and at least one other hammer body front surface, and protruding edges between the protruding surface and at least two rear surfaces, wherein the recessed edges are located below the side contact edges and the protruding edges are located above the first rod hole.

According to other aspects of the disclosure, an improved, non-forged hammer assembly for use in a rotatable hammermill assembly includes a plurality of non-planar hammer bodies. The non-planar hammer bodies comprise a recessed surface located between at least two front surfaces, a protruding surface located opposite the recessed surface and between at least two rear surfaces, a first end for securement within a hammer mouth, a first rod hole, a second end for contact and delivery of momentum to material to be comminuted, wherein said second end has a first weld hardened edge, and first and second hammer body edges that run from the first end to the second end. The non-forged hammer assembly also includes the hammer mouth. The hammer mouth has a hammer mouth front plate and a hammer mouth rear plate opposite the hammer mouth front plate, a base, a plurality of teeth, said teeth having crown edges running parallel to said base, a root edge centered between said crown edges, said non-forged hammer assembly configured to attach to a hammermill rod of the rotatable hammermill assembly. The hammer assembly may include a plurality of planar hammer bodies, each planar hammer body of the plurality of planar hammer bodies comprising a planar hammer body first surface, a planar hammer body second surface opposite the planar hammer body first surface, a proximate end for securement within the hammer mouth, a first rod hole, and a distal end for contact and delivery of momentum to material to be comminuted, wherein said distal end has a second weld hardened edge.

According to other aspects of the disclosure, a MIG welding process for embedding carbide onto a hammermill hammer includes providing a welding gun including a control switch, a contact tip, and a gas hose, providing a wire feed unit, a welding power supply, a welding electrode wire, and a shielding gas supply, setting a flow rate of shielding gas flow to be supplied by the shielding gas supply, striking an arc by pressing the control switch of the welding gun to initiate the wire feed unit, the welding power supply, and the shielding gas flow, and hardfacing the carbide onto the hammermill hammer. The process may be automated and may include repeating the striking and hardfacing steps in order to embed carbide onto several hammermill hammers.

Other aspects of the invention will be apparent to those skilled in the art from the following detailed description of the illustrated embodiments, accompanied by the attached drawings wherein identical reference numerals will be used for like parts in the various views.

BRIEF DESCRIPTION OF THE DRAWINGS

FIG. 3 provides a side view of the hammer of FIG. 1.

FIG. 4 provides a top view of the hammer of FIG. 1.

FIG. 6 provides a side view of the improved hammer assembly of FIG. 5.

FIG. 7 provides a top view of the improved hammer assembly of FIG. 5.

FIG. 10 provides a side view of the hammer of FIG. 8.

FIG. 11 provides a top view of the hammer of FIG. 8.

FIG. 22 provides a side view of the hammer of FIG. 20.

FIG. 23 provides a top view of the hammer of FIG. 20.

FIG. 27 provides a side view of the improved hammer assembly of FIG. 26.

FIG. 28 provides a top view of the improved hammer assembly of FIG. 26.

FIG. 36 provides a side view of the improved hammer assembly of FIG. 20.

FIG. 37 provides a top view of the improved hammer assembly of FIG. 20.

DETAILED DESCRIPTION

Figure 1:
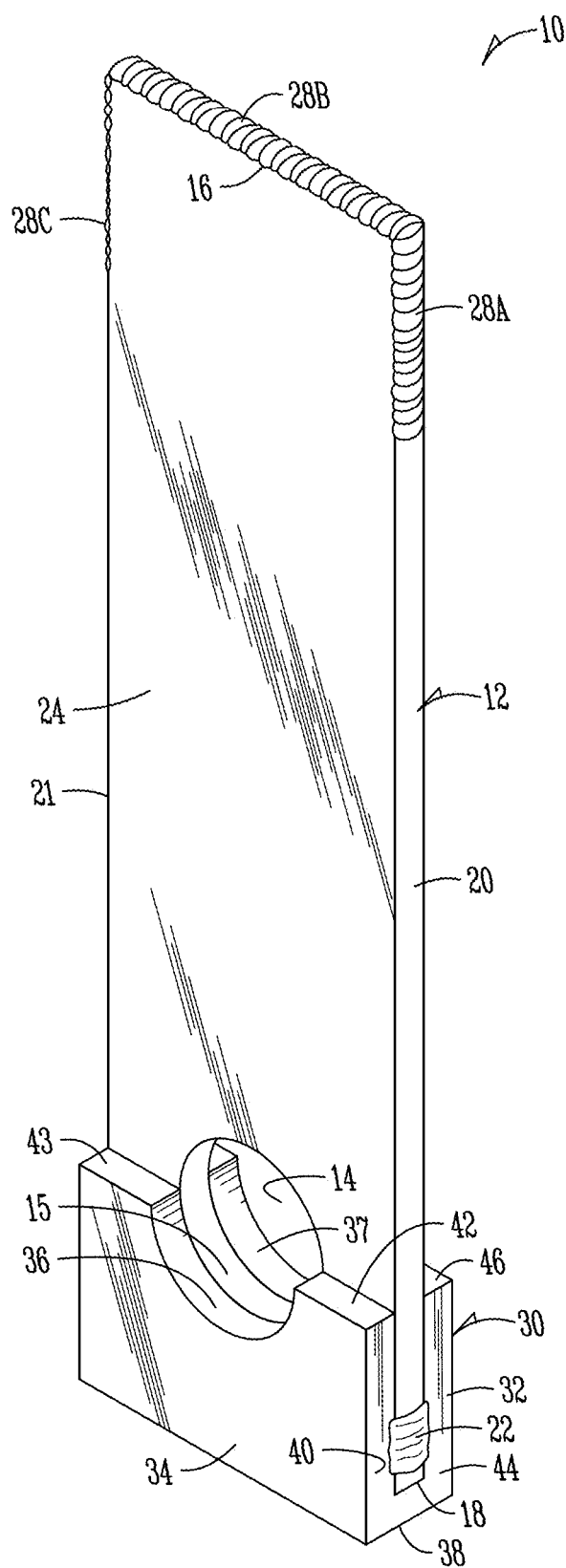
FIG. 1 provides a perspective view of an improved hammer.
Figure 2:
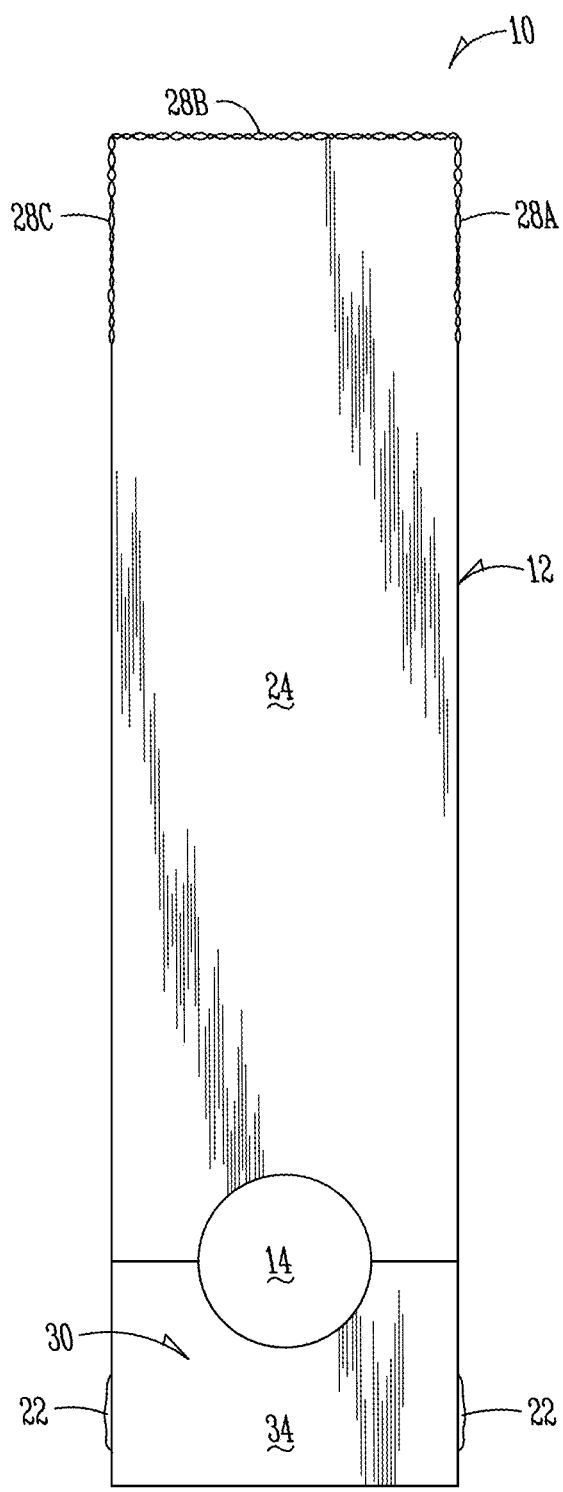
FIG. 2 provides an edge view of the hammer of FIG. 1.

The following definitions and introductory matters are provided to facilitate an understanding of the present invention.

The singular terms "a," "an," and "the" include plural referents unless context clearly indicates otherwise. Similarly, the word "or" is intended to include "and" unless the context clearly indicate otherwise. The word "or" means any one member of a particular list and also includes any combination of members of that list.

Reference is made to the accompanying drawings which form a part hereof, and in which is shown by way of illustration specific embodiments in which the invention may be practiced. These embodiments of the invention will be described in detail with reference to the drawings, wherein like reference numerals represent like parts throughout the several views. These embodiments are described in sufficient detail to enable those skilled in the art to practice the invention, and it is to be understood that other embodiments may be utilized and that mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, rear, end, sides, and the like, are referenced according to the views presented. It should be understood, however, that the terms are used only for purposes of description, and are not intended to be used as limitations. Accordingly, orientation of an object or a combination of objects may change without departing from the scope of the invention.

The improved hammers 10, 11 shown in FIGS. 1-37 increase the surface area available to support the hammer 10, 11 relative to the thickness of the hammer body 12, 13. Increasing the surface area available to support the hammer body 12, 13 while improving securement also increases the amount of material available to absorb or distribute operational stresses while still allowing the benefits of the free-swinging hammer design, e.g., recoil to non-destructible foreign objects. The configuration also greatly reduces lateral movement of the hammer 10, 11 and can be made wide enough to eliminate it completely. The hammer body 12, 13 or the hammer saddle/mouth 30, 52 can be made wider to reduce lateral movement.

The hammer body 12, 13 and the hammer saddle/mouth 30, 52 allow the two-piece hammer 10, 11 to be heat treated so that the hammer body 12, 13 is as hard as needed to reduce hole wear and acts more like spring steel (e.g., taking some impact without breaking). If hammer body 12, 13 is heat treated, the timing of the heat treatment with respect to when hammer body 12, 13 is integrated into hammer 10, 11. This configuration allows for a denser hammer pattern and hammers thinner than the industrial standard of ¼" thick.

However, in some situations, the hammer body 12, 13 may not need to be heat treated to achieve the desired level of hardness.

The width of the mounting portion of hammer 10, 11 has been increased by hammer saddle 30, thus allowing for a thinner hammer body 12, 13. Increasing the surface area available to support the hammer 10, 11 improves securement and increases the amount of material available to absorb or distribute operational stresses while still allowing the benefits of the free-swinging hammer design, e.g., recoil to non-destructible foreign objects. Additionally, the amount of material surface supporting attachment of hammer 10, 11 to a hammermill rod (not shown) is dramatically increased. This has the added benefit of eliminating or reducing the wear or grooving of the hammermill rod (not shown).

Further benefits of the improved hammer 10, 11 include the prevention of hammer 10, 11 "figure eighting" during hammermill operation.

FIGS. 1-4 show improved, non-forged planar hammers 10 to be installed in a hammermill assembly (not shown). Planar hammer 10 includes planar hammer body 12.

Hammer body distal end 16 has contact edges 28A-C that comminute and grind grains, animal food, pet food, food ingredients, mulch, bark, etc. during operation of the hammermill assembly. In the embodiment shown, hammer body 12 is symmetrical across hammer body front surface 24 and hammer body rear surface 25 such that either of the side contact edges 28A, 28C may be the leading edge during operation of the hammermill assembly. The side contact edge 28A/28C serving as the leading edge will wear much faster than the trailing side contact edge 28A/28C. Changing which side contact edge is the leading edge may be accomplished by reversing the direction of rotation of the hammermill assembly or may be accomplished by re-installing the planar hammer 10 in the mirrored orientation. The width of the contacting edges 28A-C is substantially equivalent to the width of distal end 16 of the hammer body 12. It may be preferred that contact edges 28A-C have been welded onto distal end 16 using tungsten carbide to increase hardness and durability of the planar hammer 10. It may also be preferred that side contact edges 28A, 28C be stepped, as is shown in FIGS. 20-37. Other types of welding materials known to those skilled in the art may also be applied.

Referring back to FIGS. 1-4, hammer body proximate end 18 is used to secure planar hammer 10 within hammer saddle 30 and is the end where planar hammer body 12 attaches to the hammermill rod of a hammermill assembly (not shown). Planar hammer body 12 and hammer saddle 30 are welded together where hammer body first side edge 20 meets saddle first side u-shaped edge 32. Planar hammer body 12 and hammer saddle 30 are also welded together where hammer body second side 21 meets saddle second side u-shaped edge 33 (not shown) meet. Welds 22 may span the entire width of side u-shaped edges 32, 33 or may be less than the total. Welds 22 are preferably fusion type welds, but the present disclosure also contemplates utilizing solid-state welding methods or other types of welding methods known to those skilled in the art. The present disclosure is also not limited to the use of welds to secure the planar hammers 10 to the hammer saddle 30. For example, the planar hammers 10 could be secured to the hammer saddle 30 via rivets or any other known means for fastening non-forged steel together.

Saddle 30 is generally formed by first side u-shaped edge 32 and second side u-shaped edge 33 (not shown) opposite first u-shaped edge 32. First and second side u-shaped edges 32, 33 are adjoined via saddle front surface 34 and saddle rear surface 35 (not shown) located opposite saddle front surface 34. First side u-shaped edge 32 includes first saddle leg or fender 40 and second saddle leg or fender 44 which extend upward from saddle bottom surface or saddle skirt 38. The area between saddle fenders 40, 44 may be generally the same width as hammer body 12 and fenders 40, 44 may be generally the same width as hammer body 12. First fender 40 extends upward from saddle skirt 38 until first fender 40 reaches first fender top edges 42, 43. Second fender 44 extends upward from saddle skirt 38 until second fender 44 reaches second fender top edges 46A, 46B. Top fender edges 42, 43, 46, 47 are generally parallel to saddle skirt 38 and are interrupted by elliptical rod hole edges 36, 37. In the embodiment shown in FIGS. 1-4, elliptical rod hole edges 36, 37 are semi-circular in nature.

In another embodiment of the invention, planar hammer body 12 does not incorporate first u-shaped edge 32. Instead, first fender 40 and second fender 44 stop at the proximate end 18 of planar hammer body 12, similar to the configuration shown in FIGS. 8-11, 14-17, 20-23, 29-31, and 34-37. In this configuration, saddle front surface 34 and saddle rear surface 35 are substituted for front plate 34 and rear plate 35.

Planar hammer body 12 has hammermill rod hole 14 and hammermill rod hole edge 15 near proximate end 18. In the embodiment shown, hammermill rod hole edge 15 and elliptical rod hole edges 36, 37 create a continuous surface for hammermill rod engagement. Planar hammer body 12 and saddle 30 may be welded together before attachment to a hammermill rod when the hammermill (not shown) is dis-assembled. The present disclosure is also not limited to the use of welds to secure the non-planar hammers 11 to the hammer saddle 30. For example, the non-planar hammers 10 could be secured to the hammer saddle 30 via rivets or any other known means for fastening non-forged steel together.

Figure 5:
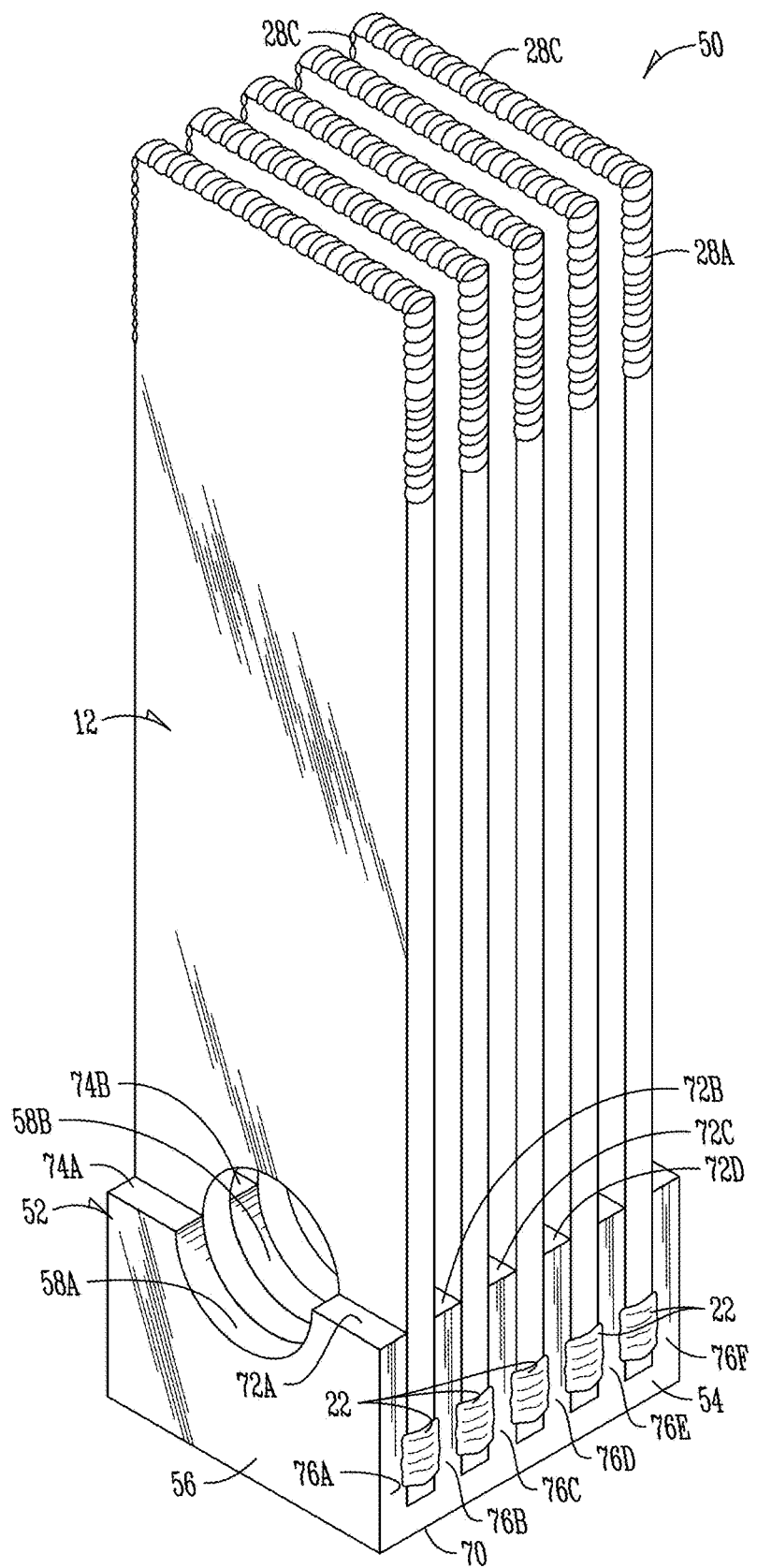
FIG. 5 provides a perspective view of a hammer assembly that implements several hammers of FIG. 1.
Figure 8:
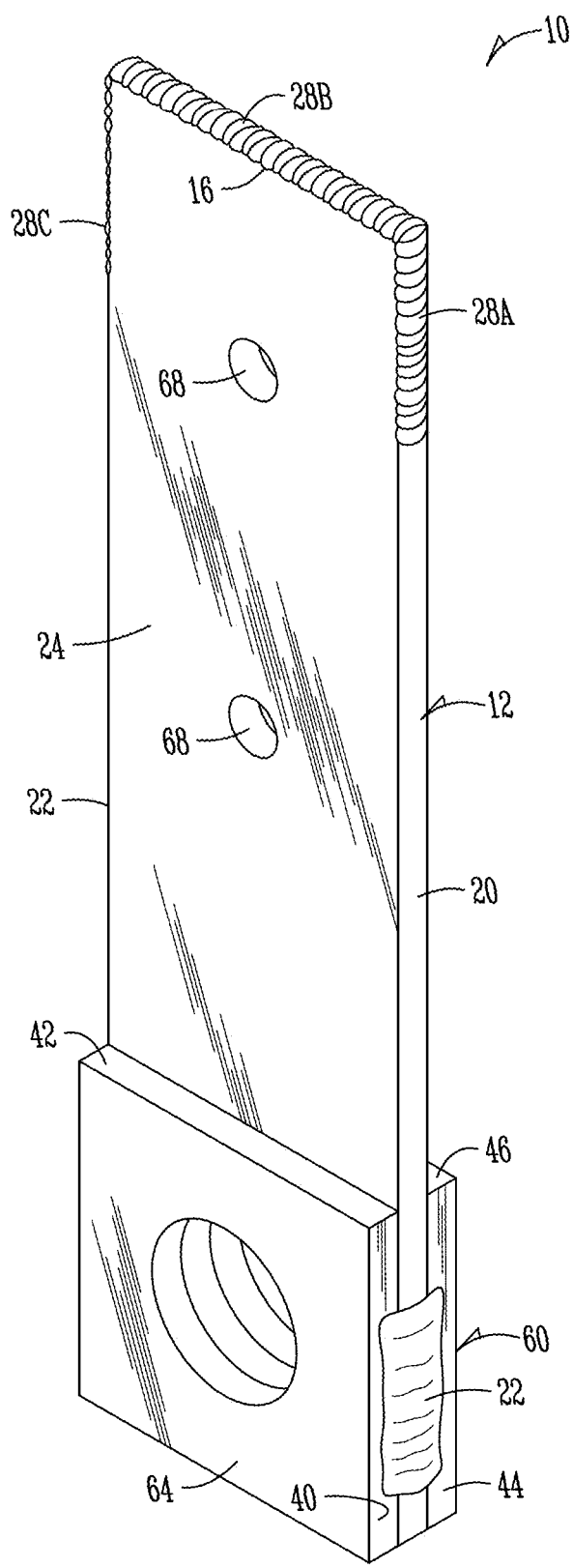
FIG. 8 provides a prospective view of an alternative embodiment of the hammer of FIG. 1.
Figure 9:
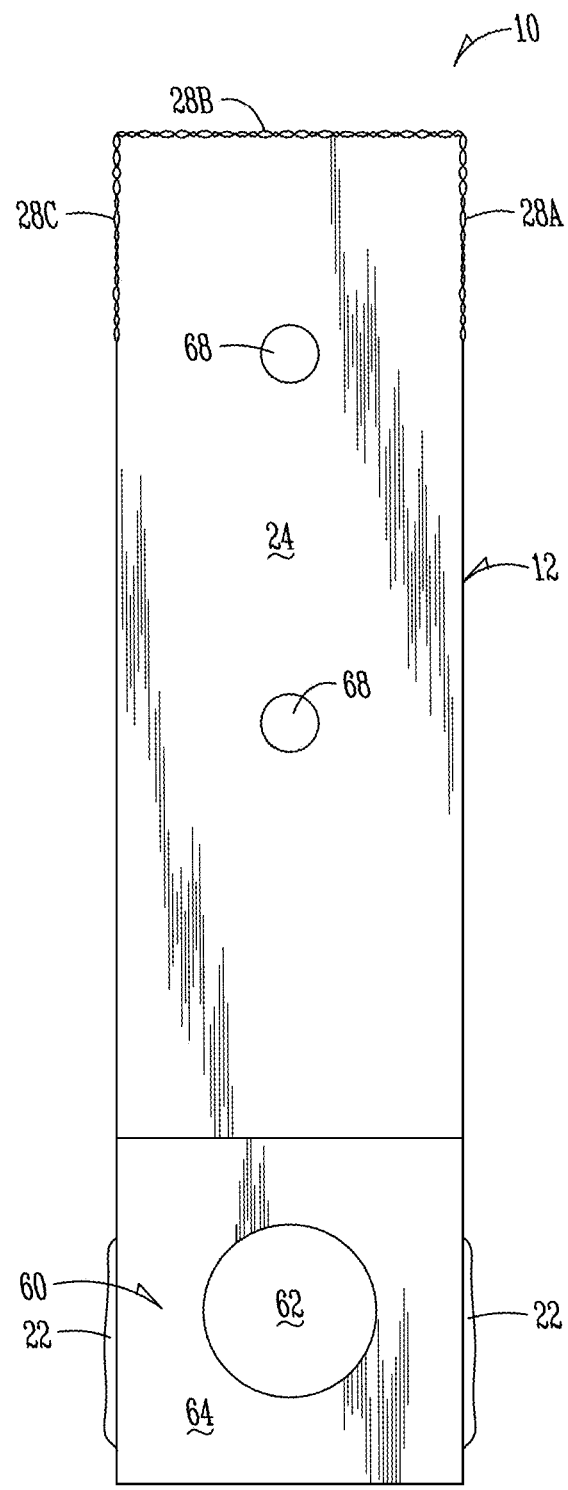
FIG. 9 provides a front view of the hammer of FIG. 8.

FIGS. 5-7 show an improved, non-forged hammer assembly 50 to be installed in a hammermill assembly using planar hammers 10 from the embodiment shown in FIGS. 1-4. As shown in FIGS. 5-7, the proximate ends 18 of the planar hammer bodies 12 are now used to secure planar hammer 10 within hammer mouth 52. Hammer mouth 52 is similar to hammer saddle 30 but is capable of securing more than one planar hammer 10.

Planar hammer bodies 12 are welded to hammer mouth 52 where hammer body first side edges 20 meet hammer mouth first and second teeth shaped surfaces 54, 55 (second teeth shaped surface 55 is located opposite first teeth shaped surface 54 and is not shown) via welds 22. Welds 22 are preferably fusion type welds, but the present disclosure also contemplates utilizing solid-state welding methods or other types of welding methods known to those skilled in the art. Hammer body 12 and hammer mouth 52 may be welded together before attachment to a hammermill rod when the hammermill (not shown) is dis-assembled.

Hammer mouth 52 is generally formed by first teeth shaped surface 54 having a plurality of fenders or teeth and second teeth shaped surface 55 (not shown) mirroring first teeth shaped surface 54. The teeth shaped surfaces are adjoined via puzzle piece shaped surfaces 56, 57 (rear puzzle piece shaped surface 57 is located opposite front puzzle piece shaped surface 56 and is not shown). In the embodiment shown, teeth shaped surface 54 has six first teeth, 76A-F, which extend away from bottom surface or base 70. Similarly, second teeth shaped surface 55 has six second teeth 78A-F positioned opposite first teeth 76A-F. First teeth 76A-F have first crown edges 72A-F and second teeth 78A-F have second crown edges 74A-F. First and second crown edges 72A-F, 74A-F are interrupted by root edges 58A-F. Crown edges 72A-F, 74A-F are generally parallel to bottom surface or base 70.

FIGS. 5-7 show five hammer bodies 12 interfacing with root edges 58A-F to create a continuous surface for hammermill rod engagement, however any number of hammer bodies and teeth are contemplated for use in hammer assembly 50. Teeth 76A-F, 78A-F are generally the same width as hammer body 12, but may be different widths.

FIGS. 8-19 show alternative embodiments of improved hammer 10.

Figure 16:
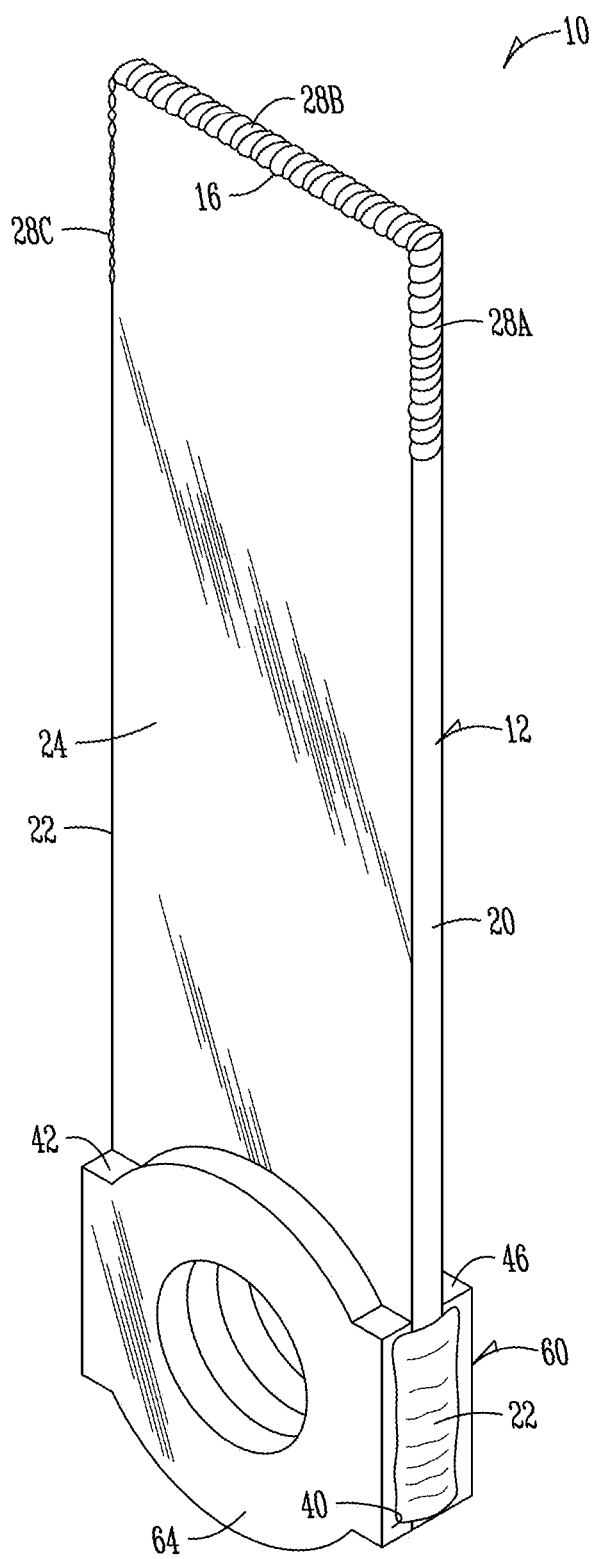
FIG. 16 provides a prospective view of another alternative embodiment of the hammer of FIG. 1.
Figure 17:
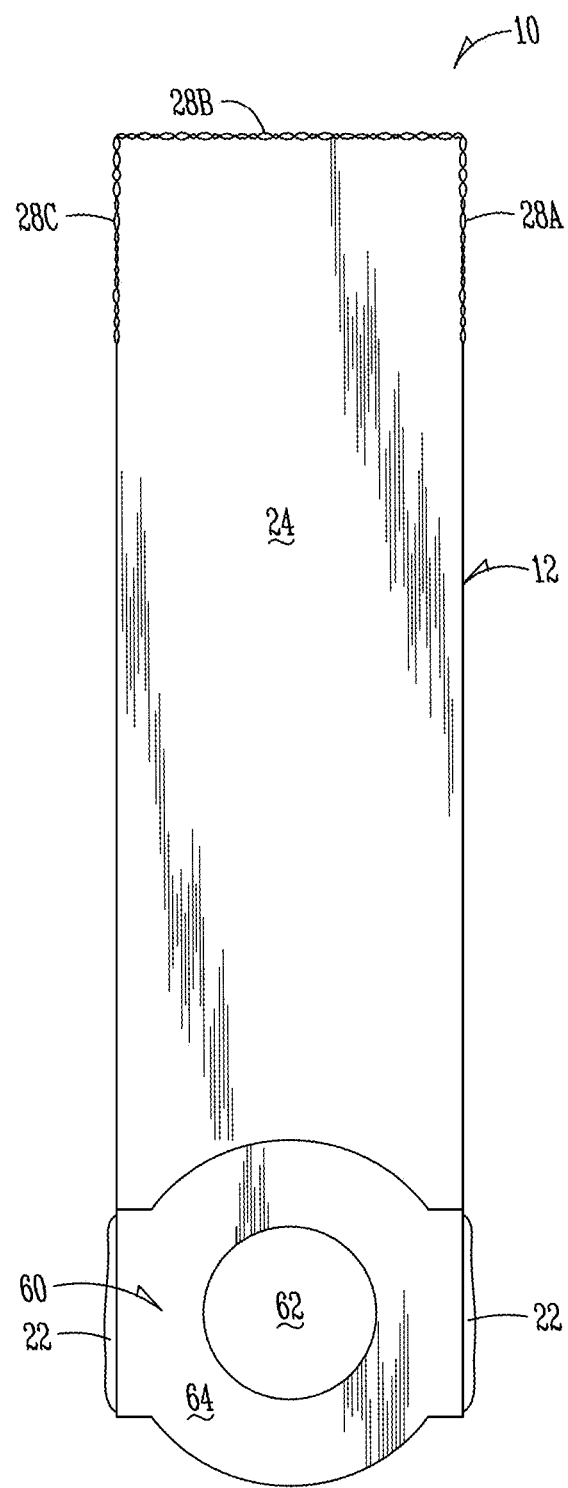
FIG. 17 provides a front view of the hammer of FIG. 16.
Figure 18:
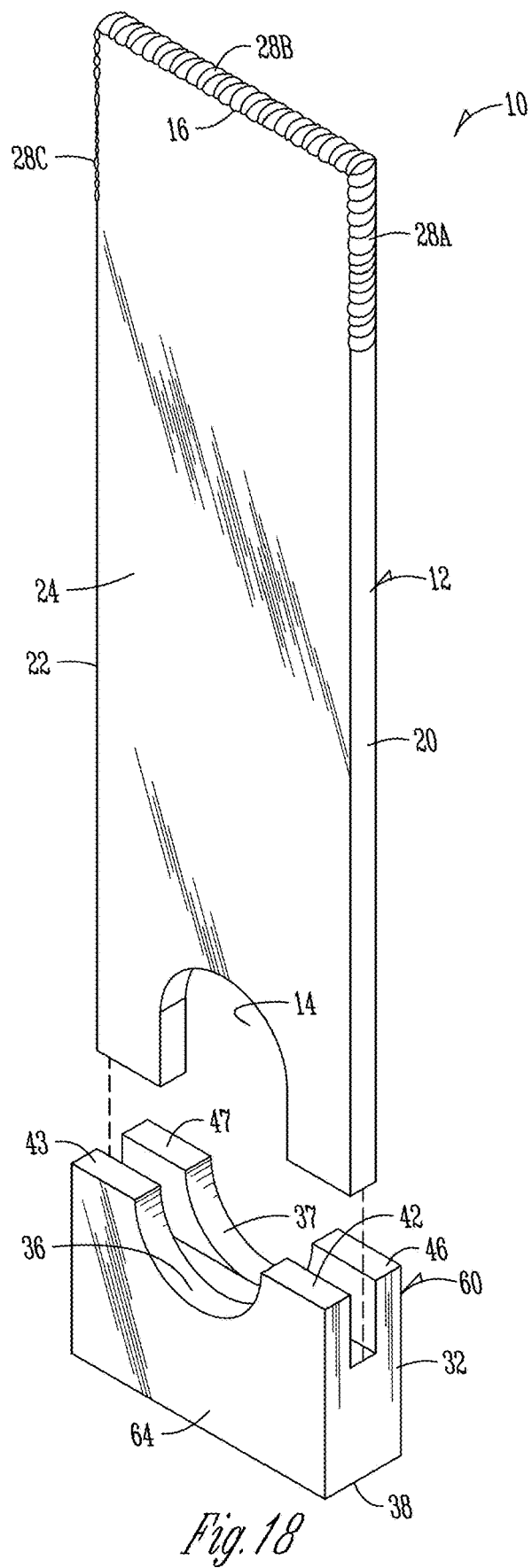
FIG. 18 provides an exploded prospective view of another alternative embodiment of the hammer of FIG. 1.
Figure 19:
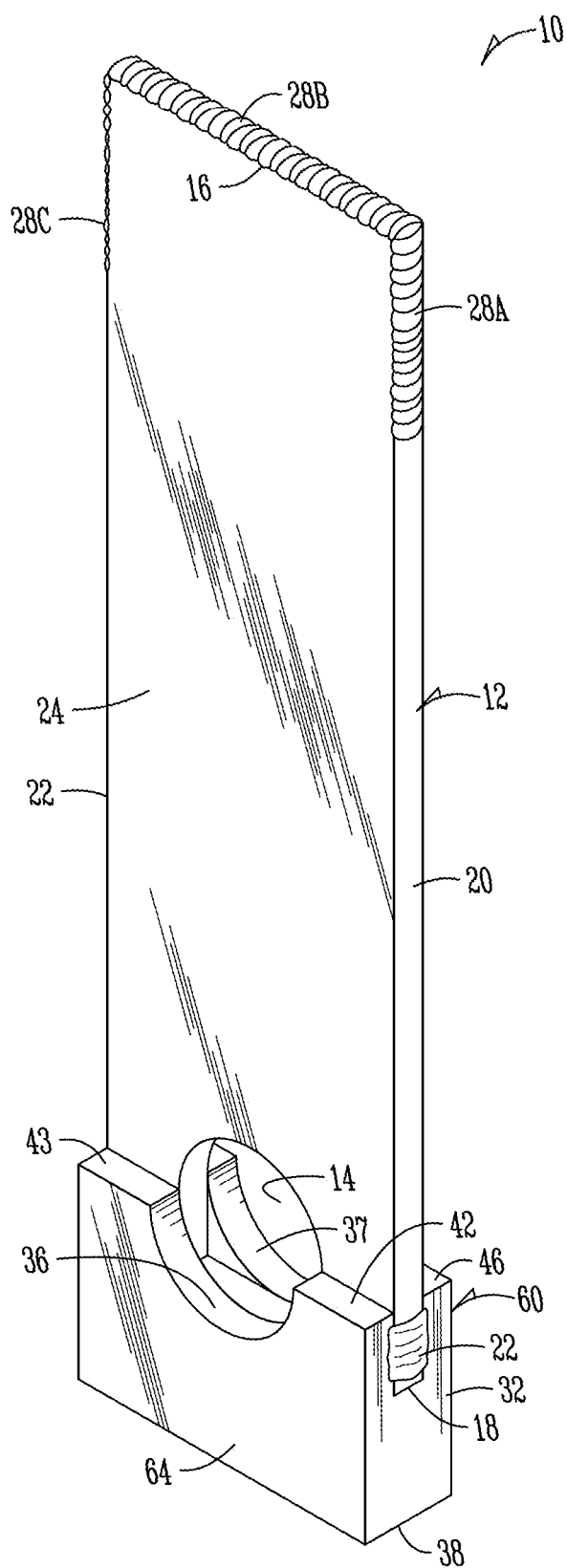
FIG. 19 provides an assembled prospective view of the hammer of FIG. 18.
Figure 20:
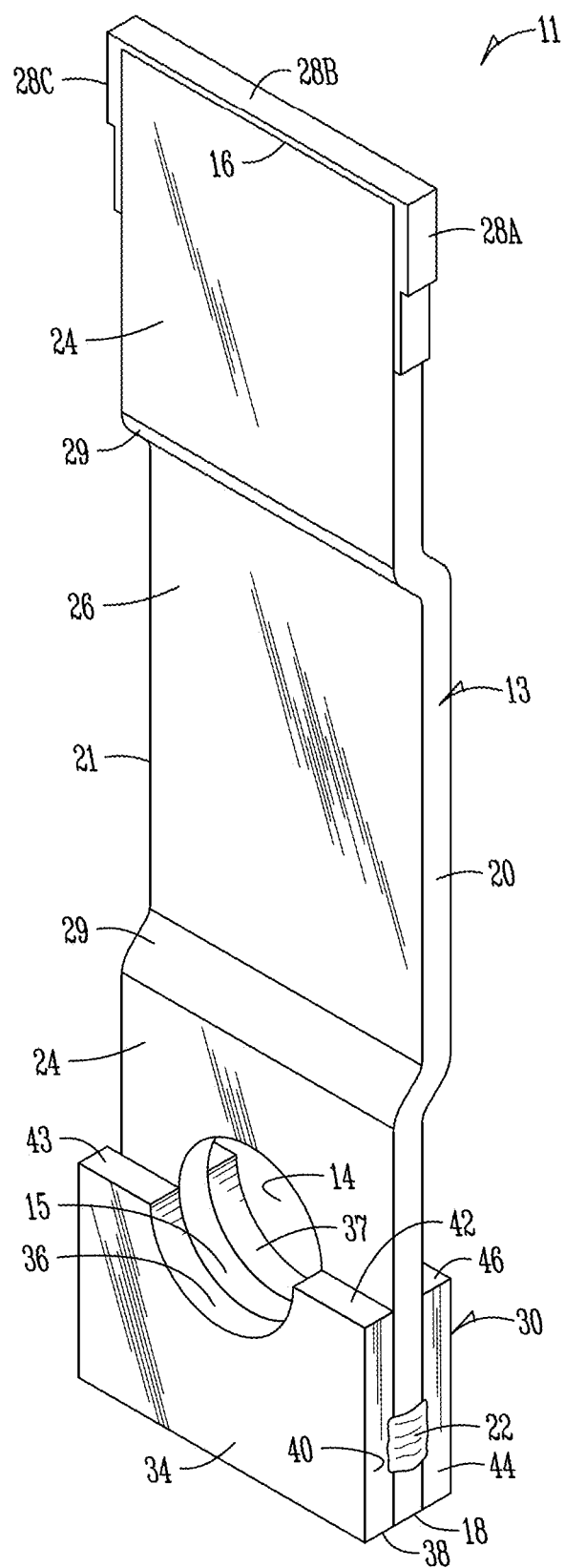
FIG. 20 provides a perspective view of an improved hammer with a recessed surface.
Figure 21:
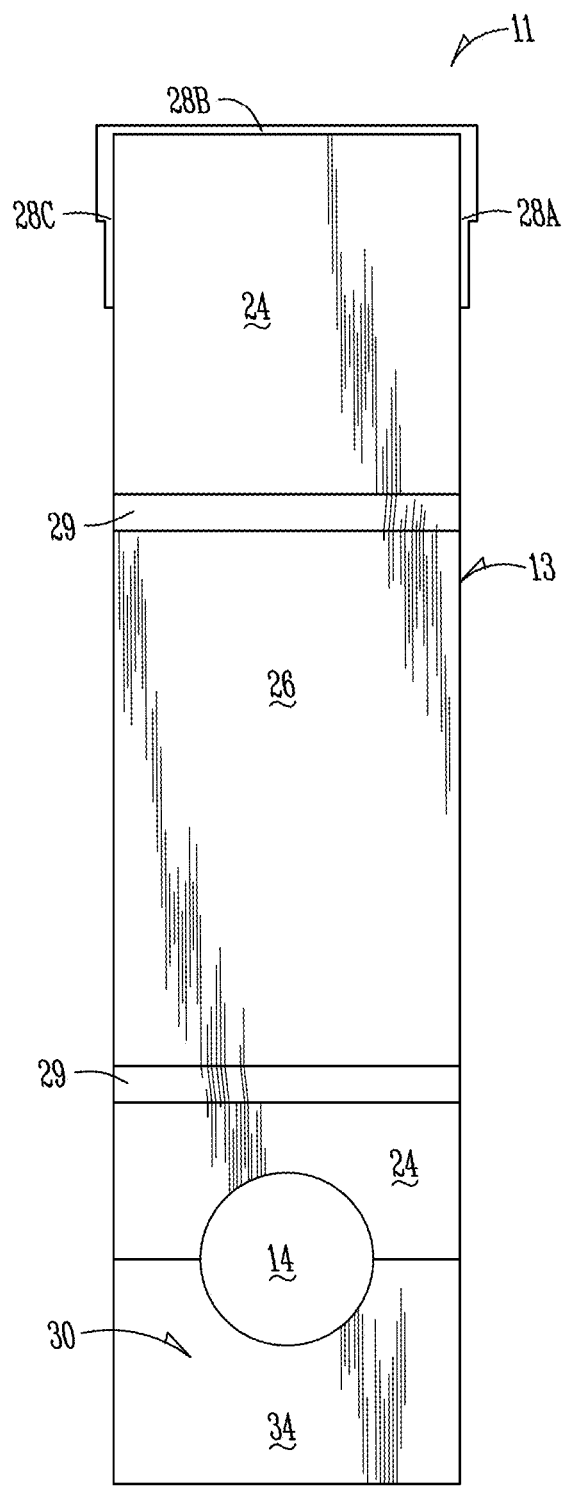
FIG. 21 provides an edge view of the hammer of FIG. 20.

The hammers shown in FIGS. 8-19 substitutes saddle 30 for variable saddle 60; hammermill rod hole 14 for variable hammermill rod hole 62; saddle front and rear surfaces 34, 35 for variable saddle front and rear surfaces 64, 65; and first and second first fender top edges 42, 43, 46, 47 for first and second fender top edges 41, 45 (with the exception of FIGS. 18-19).

FIGS. 8-11 do not show u-shaped edges 32, 33 and instead show planar hammer body 12 extending through the entire length of variable hammer saddle 60 (similar configurations are shown in FIGS. 14-17, 20-23, 29-31, and 34-37). Variable hammer saddle 60 in FIGS. 8-11 is shown as a rectangular plate secured to hammer body 12 via welds 22. Variable hammermill rod hole 62 is bored through variable hammer saddle 60 and is circular in nature in FIGS. 8-11. Because variable hammer saddle 60 is no longer open on one-side (e.g. variable hammer saddle 60 is not u-shaped or puzzle-piece shaped) it is preferred that variable hammer saddle 60 be two separate plates, one for each side of planar hammer body 12, so that an operator of the hammermill can still easily replace worn or broken hammers without having to disassemble the hammermill rod from the hammermill assembly. However, because there are at least three separate pieces 12, 60, 60 that comprise planar hammer 10, it may be preferred to use stronger or longer welds 22 that span more length of the hammer body sides 20, 21, as is shown.

Additionally, FIGS. 8-11 show planar hammer body 12 including hammer body holes 68 to allow for a lighter blade. Hammer body holes 68 may be elliptical (including circular), partially elliptical (including oval shaped and semi-circular), conical, or polygonal in nature, be shaped to form any other known shapes, or shaped using a combination of any of the preceding shapes.

Figure 12:
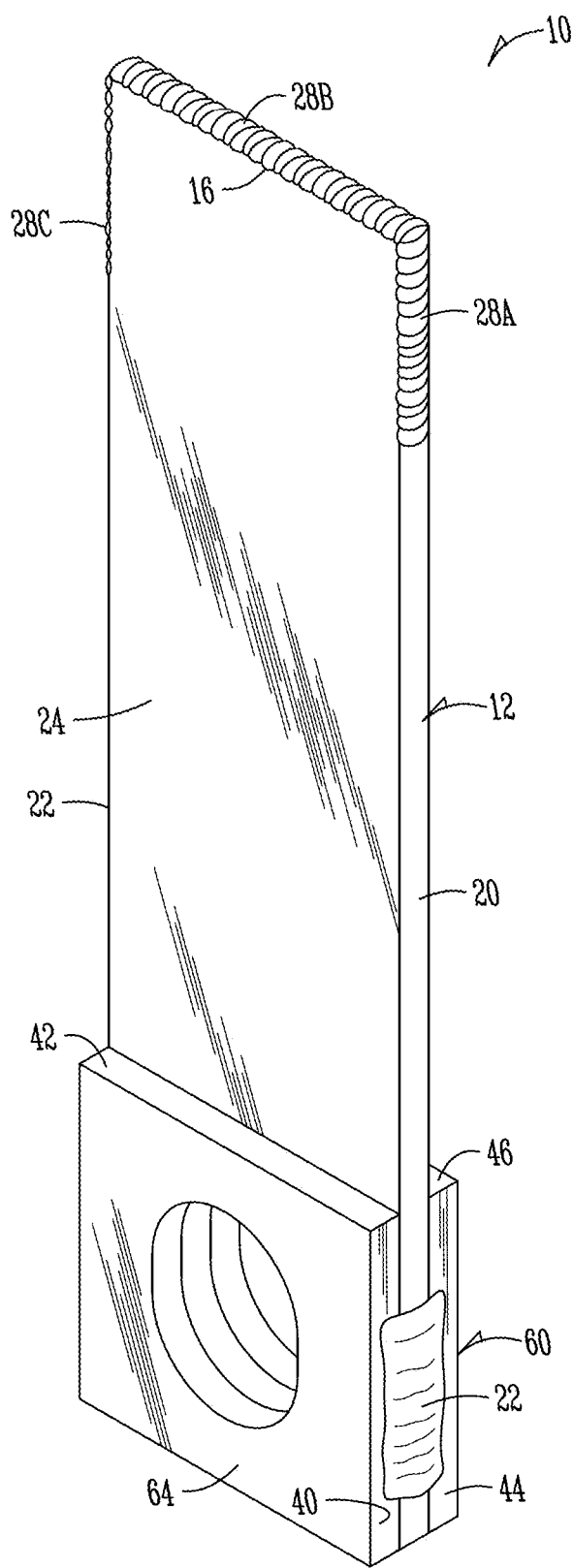
FIG. 12 provides a prospective view of another alternative embodiment of the hammer of FIG. 1.
Figure 13:
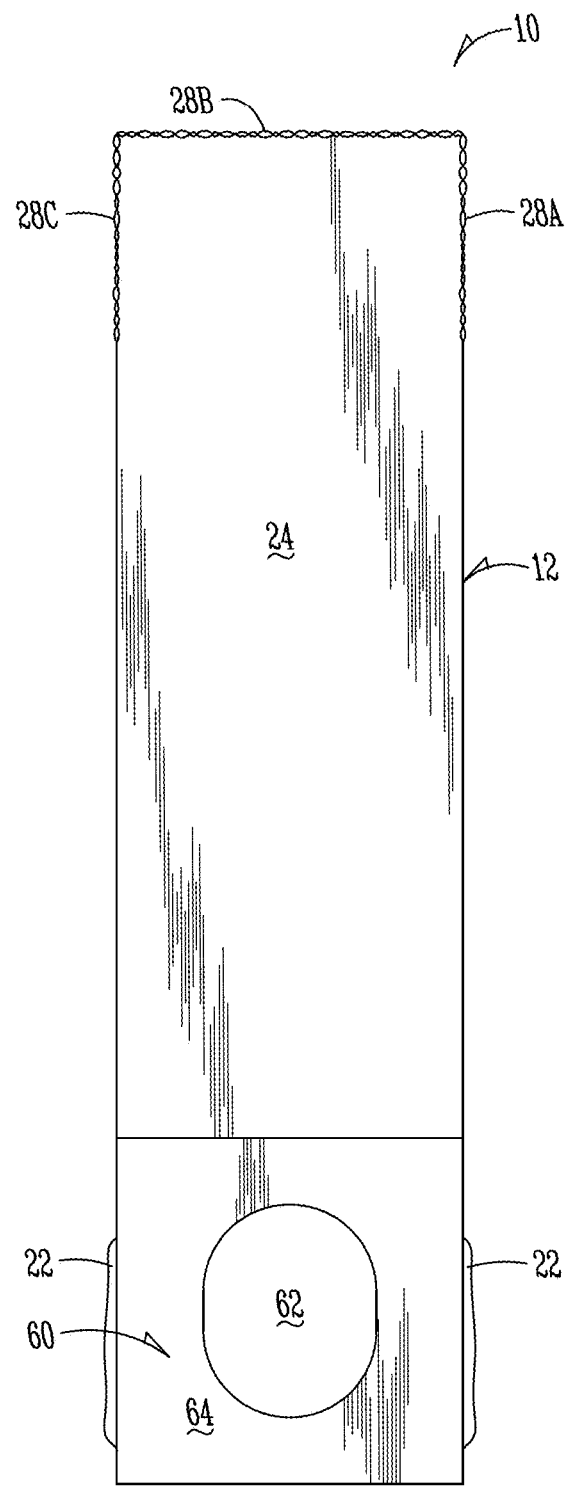
FIG. 13 provides a front view of the hammer of FIG. 12.
Figure 14:
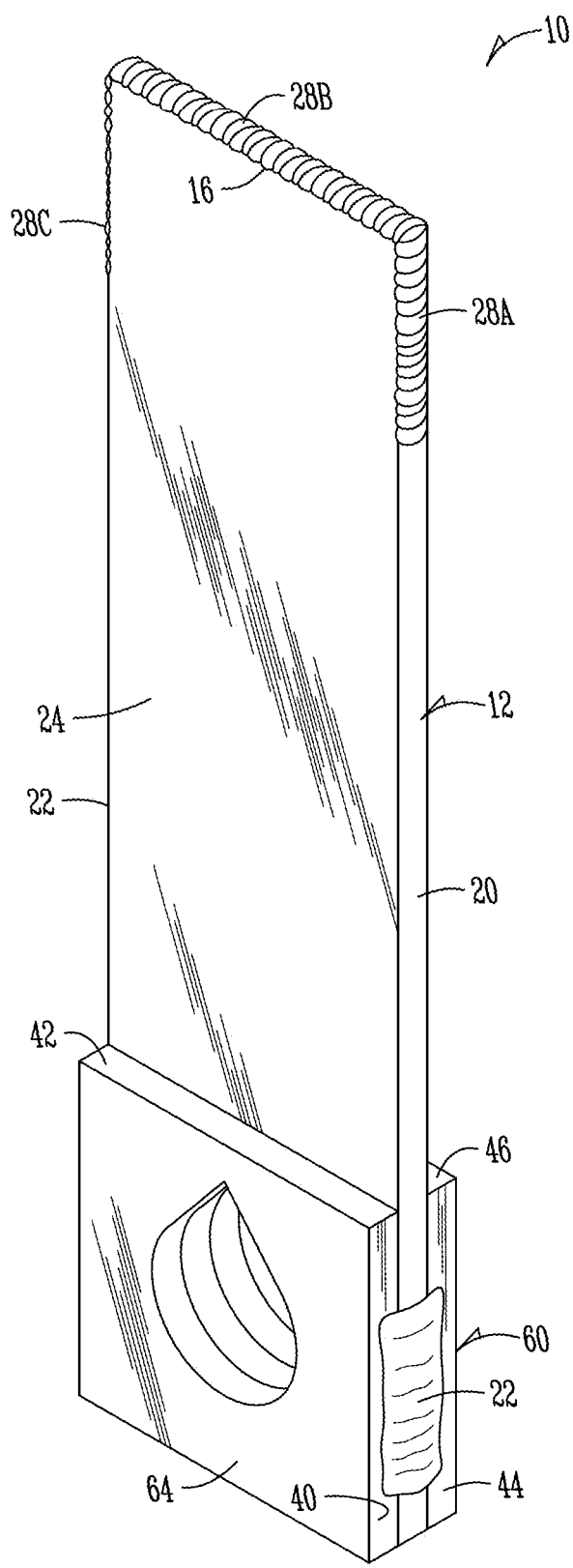
FIG. 14 provides a prospective view of another alternative embodiment of the hammer of FIG. 1.
Figure 15:
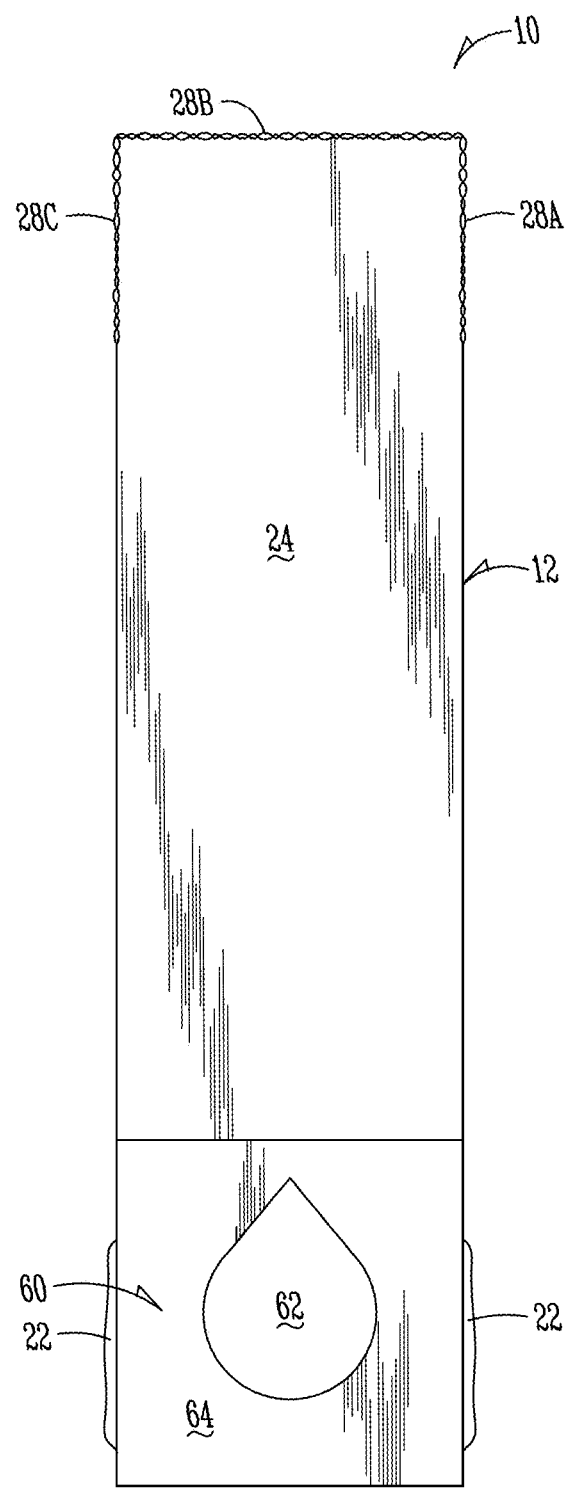
FIG. 15 provides a front view of the hammer of FIG. 14.

FIGS. 12-15 show variable hammermill rod hole 62 taking various shapes. In FIGS. 12-13, variable hammermill rod hole 62 is oval shaped, and in FIGS. 14-15, variable hammermill rod hole 62 is partially conical or tear-drop shaped. These shapes still allow for a cylindrical hammermill rod to pass through the hammer 10/11 and will still allow the hammer 10/11 to recoil if hammer 10/11 collides with a non-destructible foreign object in the hammermill. The oval shape in particular will allow the hammer to move in an additional dimension to help ease the impact caused by recoil colliding with non-destructible foreign objects (e.g., in FIGS. 12-13 the hammer is not only be allowed to rotate circumferentially around the hammermill rod, but is allowed to slide up and down as well). The scope of the present disclosure is not limited to the use of these shapes for variable hammermill rod hole 62, and other shapes that have similar features and obtain similar results are contemplated by the present disclosure. Additionally, these shapes produce extra space that is not occupied by the hammermill rod when the hammermill is in operation. The extra space will prevent the hammers 10/11 from locking on the hammermill rod and allow operators of the hammermill to clean the hammermill more easily after repeated grinding.

FIGS. 16-17 show variable hammer saddle 60 using a buckle shape for variable saddle front and rear surfaces 64, 65 (65 not shown). This shape allows the hammer 10/11 to be lighter near the mounting portion of the hammer 10/11. If using a shape other than the rectangular shape shown in FIGS. 8-15 or the buckle shape shown in FIGS. 16-17 for variable hammer saddle 60, it may be preferred that hammermill saddle still spans the entire width of hammer body front and rear surfaces 24, 25 (25 not shown) so that there is no need for the use of complex welds. Again, it should be noted the present disclosure is not limited to the use of these shapes for variable hammer saddle 60, and other shapes that have similar features and obtain similar results are contemplated by the present disclosure.

FIGS. 18-19 show an alternative embodiment wherein hammermill rod hole 14 is u-shaped to allow easier installation on a hammermill rod without dis-assembling said hammermill. In such an embodiment, the variable hammer saddle 60 is one integral piece just as it was in FIGS. 1-4 but includes some of the material within the bottom of the hammer 10/11 that the hammer body 12/13 of FIGS. 1-4 included.

FIGS. 20-23 show non-planar, improved hammers 11 to be installed in a hammermill assembly (not shown). The non-planar hammer 11 of FIGS. 20-23 differs from the planar hammer 10 of FIGS. 1-4 because non-planar hammer 11 includes a recessed surface 26 and a protruding surface 27 (not shown) opposite recessed surface 26.

The recessed and protruding surfaces 26, 27 recess or protrude via recessed/protruding edges 29. In the preferred embodiment, recessed and protruding edges 29 recess or protrude at a depth that is approximately identical to the width of hammer body edges 20, 21. This may cause recessed surface 26 to exist within the same plane as rear surface 25. Additionally, recessed and protruding edges 29 recess or protrude at a rate of depth that is approximately forty-five degrees. However, the present disclosure is not limited to the configuration described in the preferred embodiment, as recessed and protruding edges 29 may recess or protrude any depth or distance and at any rate of depth. Generally, recessed/protruding edges 29 are located below welded contact edges 28A-C and above the top of hammermill rod hole 14 towards the center of non-planar hammer body 13. The recessed/protruding edges 29 may be symmetrically positioned on hammer 11 such that each are located an equal distance from their respective edges 16, 18.

Figure 24:
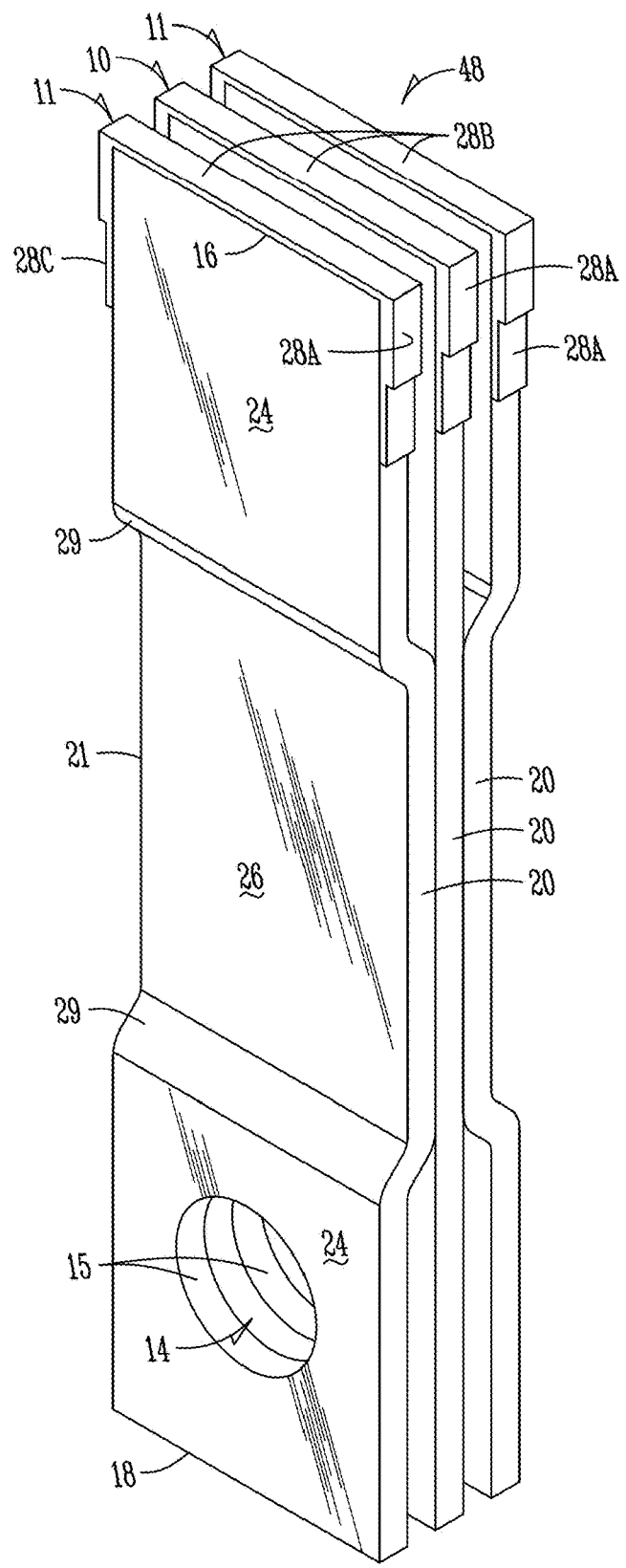
FIG. 24 provides a perspective view of a trident shaped hammer configuration.

In the embodiment shown in FIG. 24, a multi-bodied hammermill hammer including two non-planar hammers 11 and a planar hammer 10 is arranged and oriented in a three-pronged fork shaped or trident shaped configuration 48. In the trident shaped configuration 48, a planar hammer body 12 and two non-planar hammer bodies 13 are arranged and oriented such that the planar hammer body 12 abuts and is sandwiched between the two non-planar hammer bodies 13, and the distal and proximate ends 16, 18 of the hammer bodies 12, 13 extend away from the center of the hammer bodies 12, 13 to create three prongs.

Figure 25:
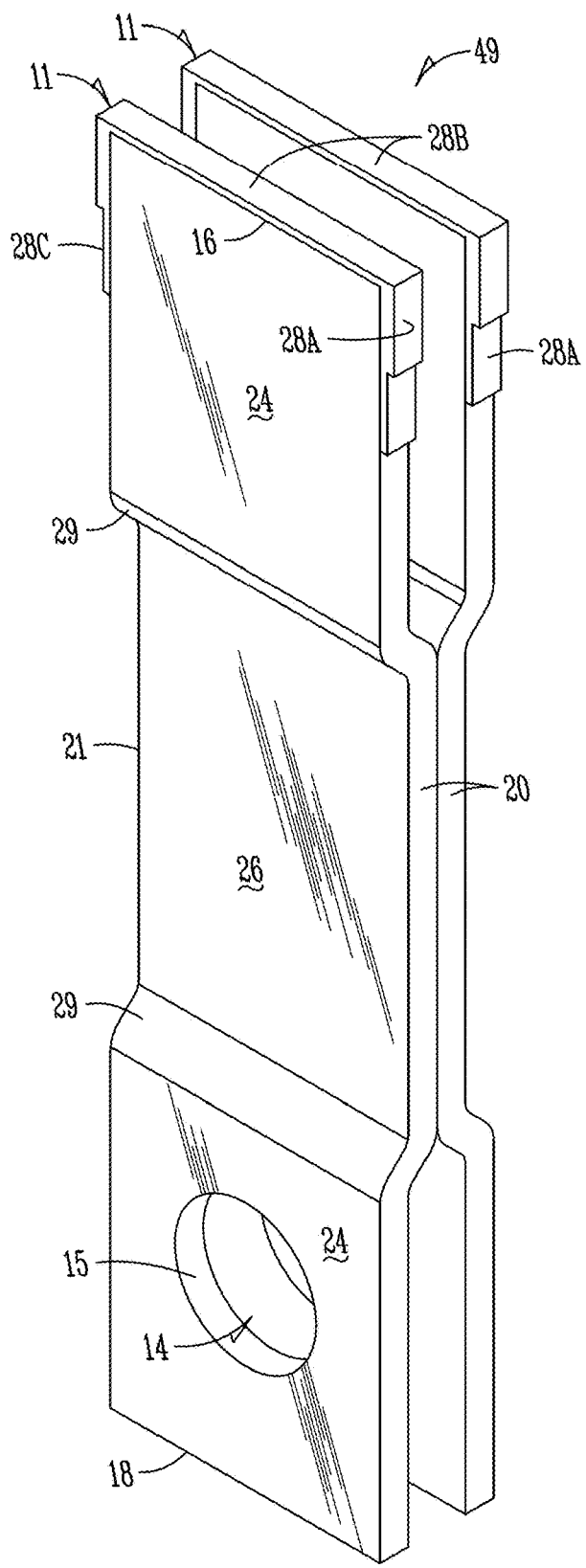
FIG. 25 provides a perspective view of a pitchfork shaped hammer configuration.

In the embodiment shown in FIG. 25, a multi-bodied hammermill hammer including two non-planar hammers 11 is arranged and oriented in a bident shaped or pitchfork shaped configuration 49. In the pitchfork shaped configuration 49, two non-planar hammer bodies 13 are arranged and oriented such that the protruding surfaces 27 of the two non-planar hammer bodies 13 abut one another, and the distal and proximate ends 16, 18 of the non-planar hammer bodies 13 extend away from the protruding surfaces 27 to create two prongs.

Figure 26:
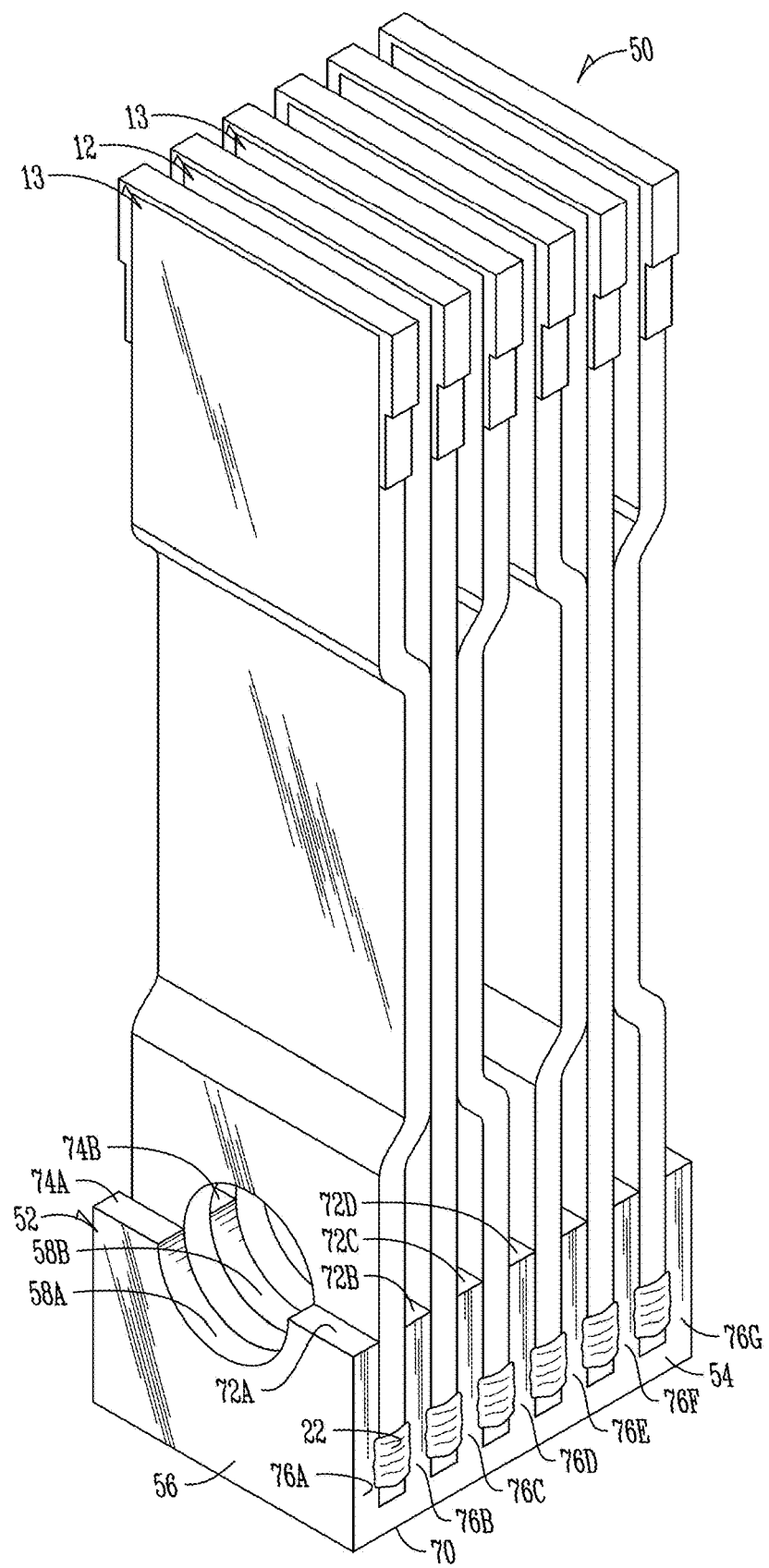
FIG. 26 provides a perspective view of a hammer assembly that implements several hammers of FIG. 1 and FIG. 20.

FIGS. 26-37 show improved, non-forged hammer assemblies 50, 150, 250, 350 to be installed in a hammermill assembly using hammers 10, 11. As is shown in FIGS. 26-28 (and is analogously shown in FIGS. 29-37), proximate ends 18 of hammer bodies 12, 13 are now used to secure hammers 10, 11 within hammer mouth 52. Hammer mouth 52 is similar to hammer saddle 30 but is capable of securing more than one hammer 10, 11.

Hammer bodies 12, 13 are welded to hammer mouth 52 where hammer body first side edges 20 meet hammer mouth first and second teeth shaped surfaces 54, 55 (second teeth shaped surface 55 not shown; second teeth shaped surface 55 is located opposite first teeth shaped surface 54) via welds 22. Welds 22 are preferably fusion type welds, but the present disclosure also contemplates utilizing solid-state welding methods or other types of welding methods known to those skilled in the art. Hammer bodies 12, 13 and hammer mouth 52 may be welded together before attachment to a hammermill rod when the hammermill (not shown) is dis-assembled. Again, it should be noted that the present disclosure is also not limited to the use of welds to secure the hammers 10, 11 to the hammer mouth 52. For example, the hammers 10, 11 could be secured to the hammer mouth 52 via rivets or any other known means for fastening non-forged steel together.

Hammer mouth 52 is generally formed by first teeth shaped surface 54 having a plurality of fenders or teeth and second teeth shaped surface 55 mirroring first teeth shaped surface 54. The teeth shaped surfaces 54, 55 are adjoined via puzzle piece shaped surfaces 56, 57 (rear puzzle piece shaped surface 57 is located opposite front puzzle piece shaped surface 56 and is not shown).

Hammer bodies 12, 13 interface with root edges 58 to create a continuous surface for hammermill rod engagement. Teeth 76, 78 are generally the same width as hammer bodies 12, 13, but may be different widths.

Figure 29:
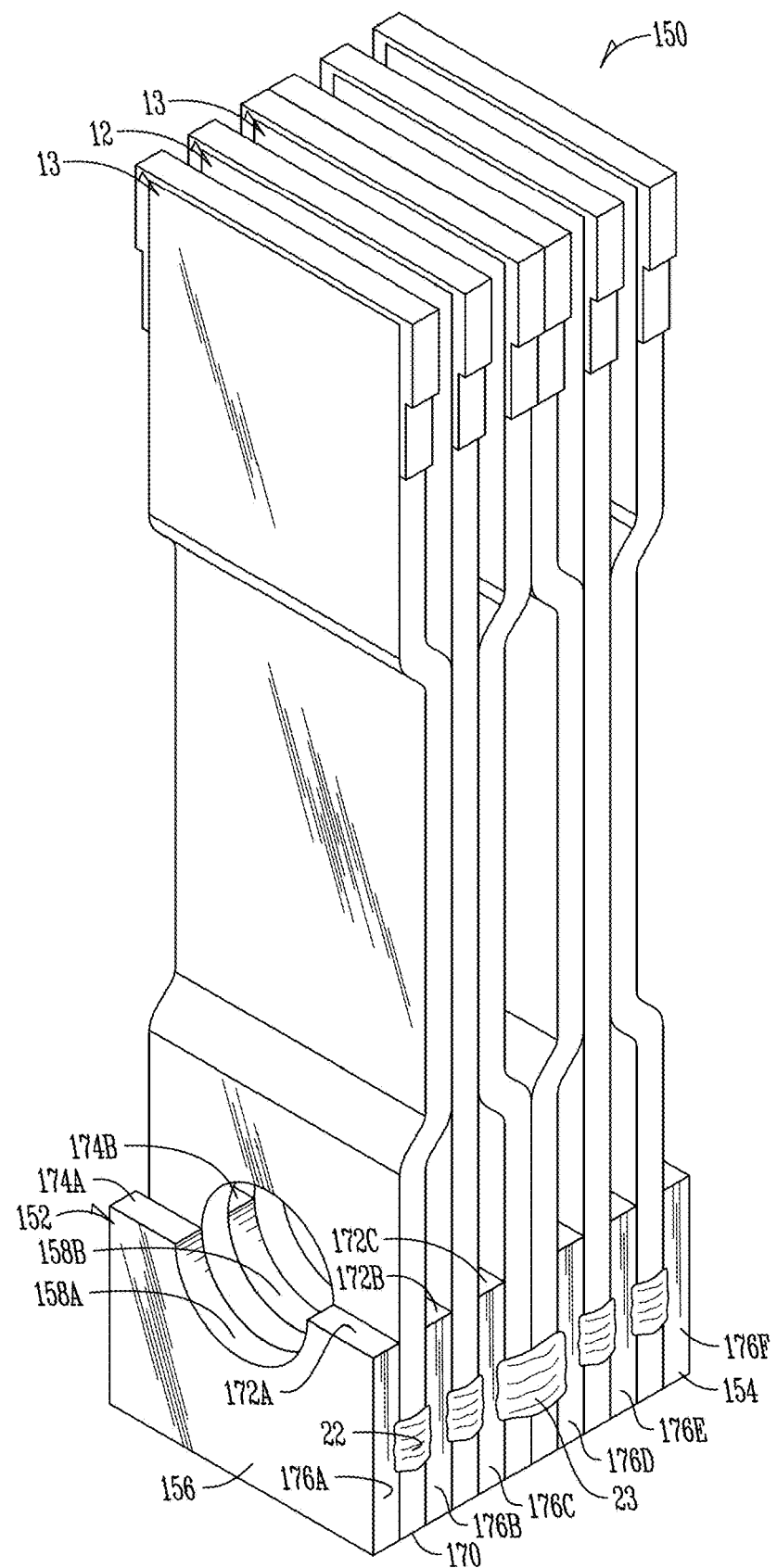
FIG. 29 provides a perspective view of a non-planar hammer assembly that implements several hammers of FIG. 1 and FIG. 20.
Figures 30, 31:
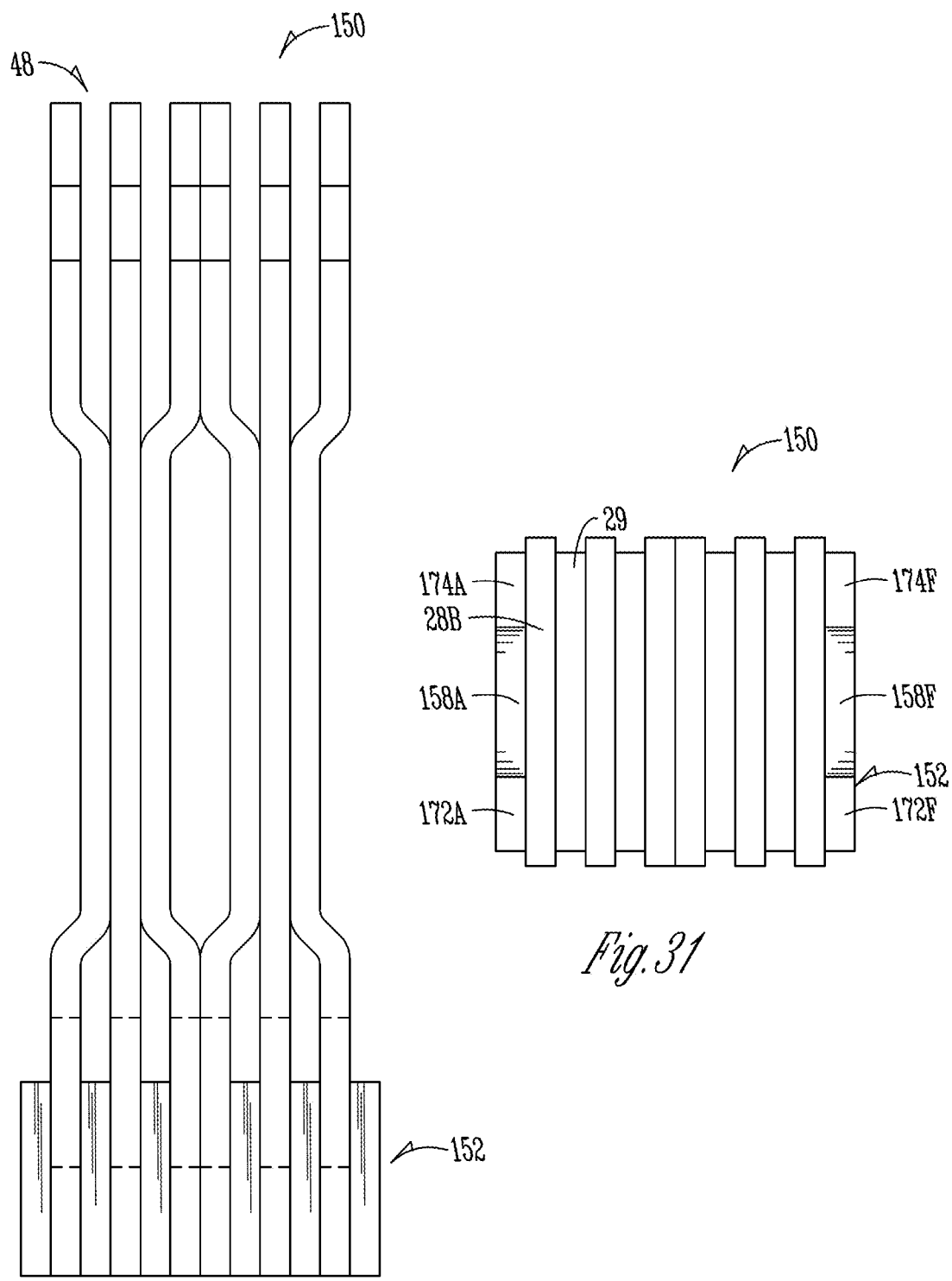
FIG. 30 provides a side view of the improved hammer assembly of FIG. 29.
FIG. 31 provides a top view of the improved hammer assembly of FIG. 29.
Figure 35:
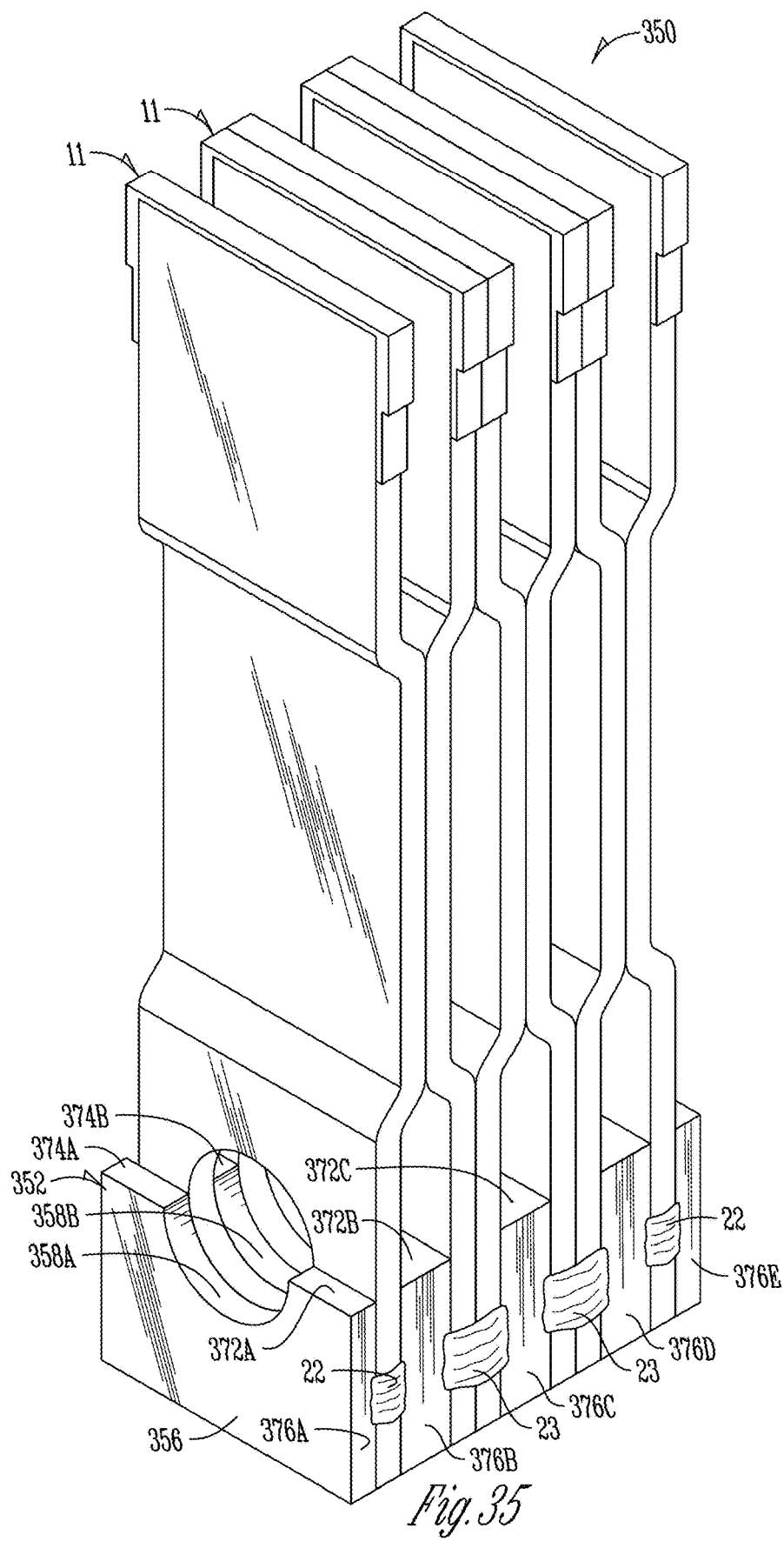
FIG. 35 provides a perspective view of a non-planar hammer assembly that implements several hammers of FIG. 20.
Figure 38:
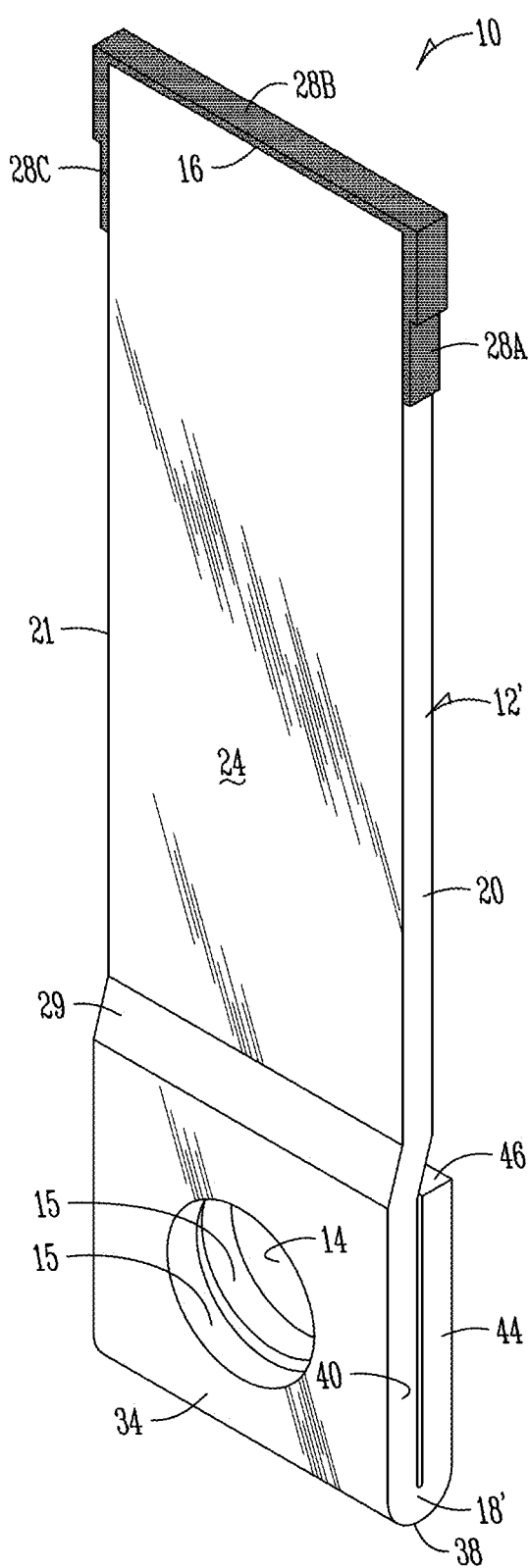
FIG. 38 provides a top perspective view of an alternative improved hammer that includes a U-shaped proximate end which may have been formed as a result of a hot-working process.
Figure 39:
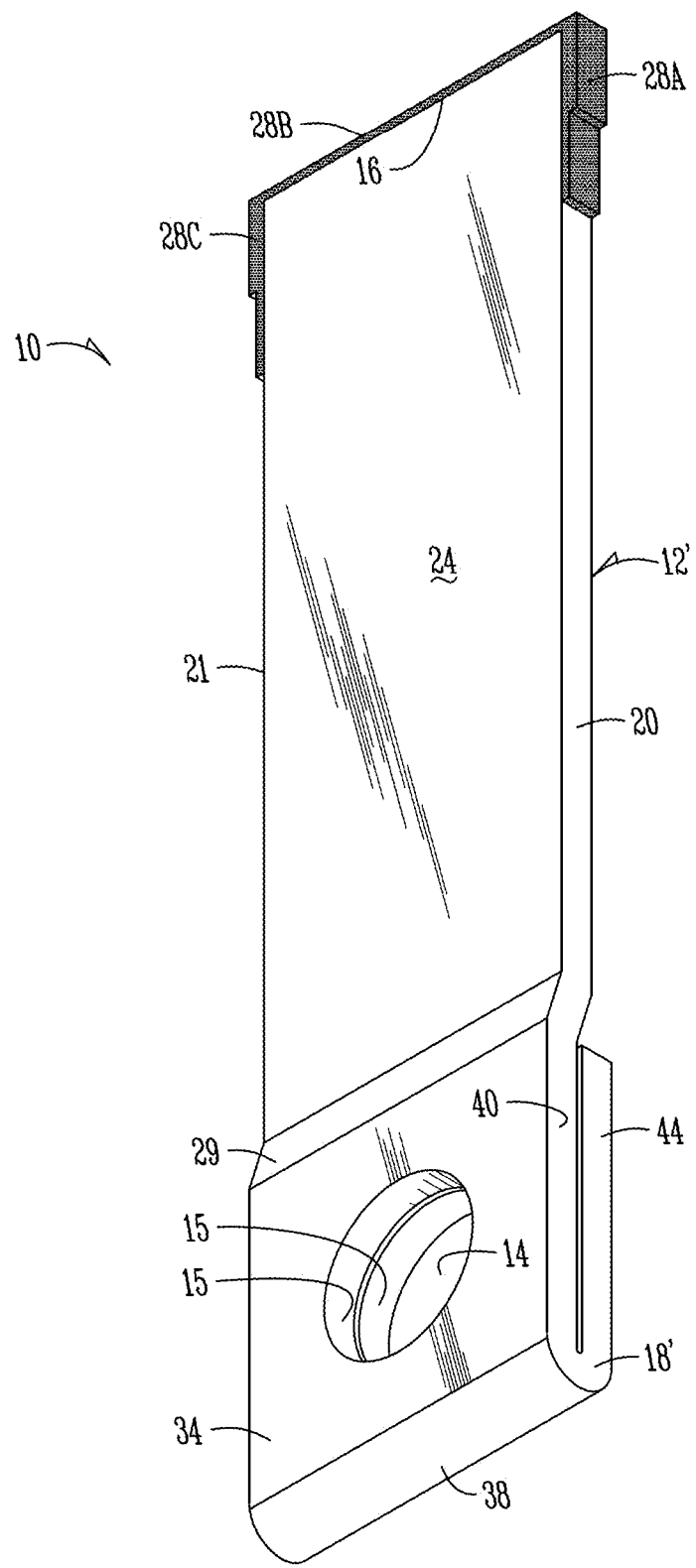
FIG. 39 provides a bottom perspective view of the alternative improved hammer of FIG. 38.
Figures 40, 41, 42, 43:
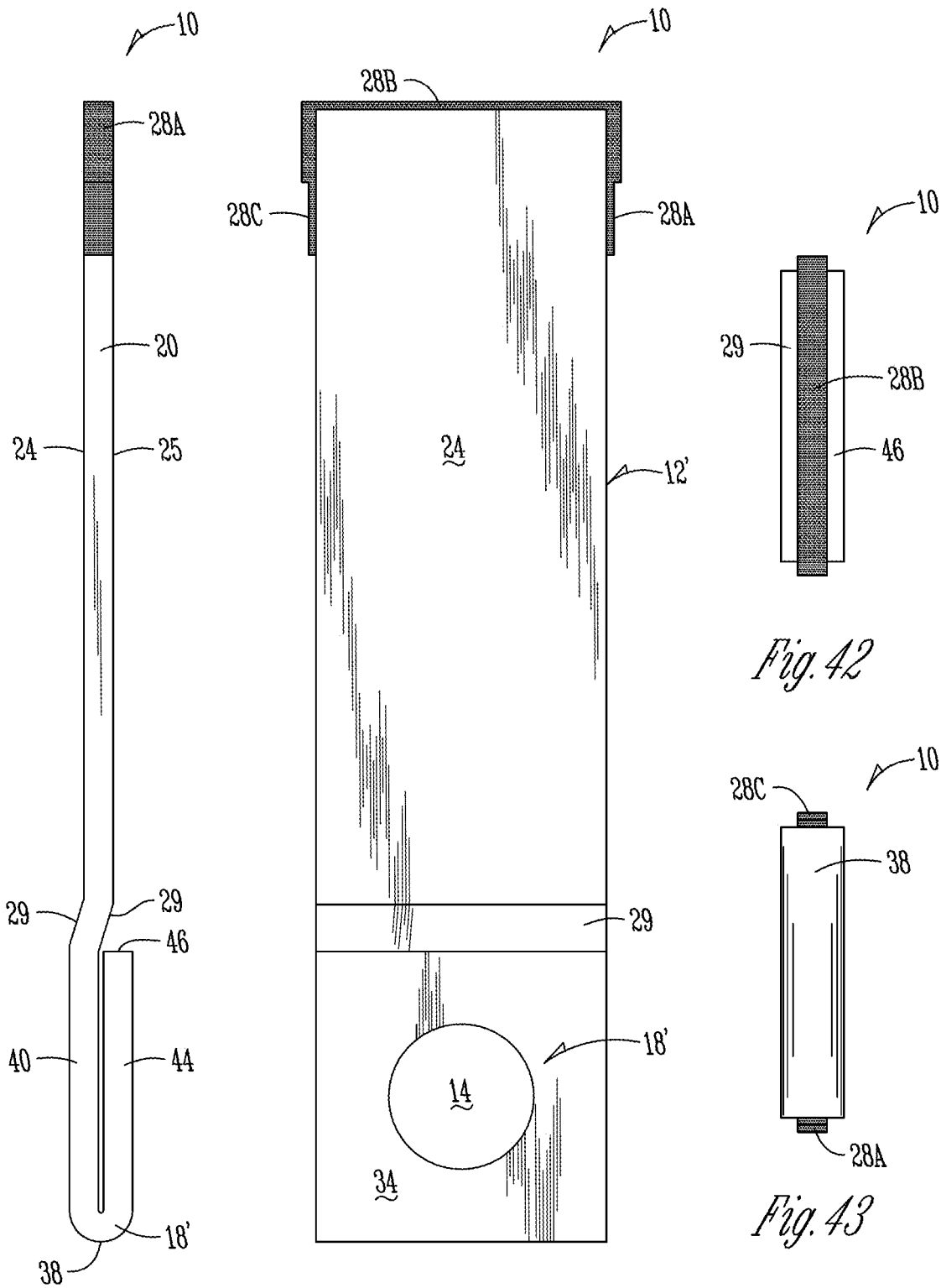
FIG. 40 provides a side elevation view of the alternative improved hammer of FIG. 38.
FIG. 41 provides a front elevation view of the alternative improved hammer of FIG. 38.
FIG. 42 provides a top elevation view of the alternative improved hammer of FIG. 38.
FIG. 43 provides a bottom elevation view of the alternative improved hammer of FIG. 38.
Figure 44:
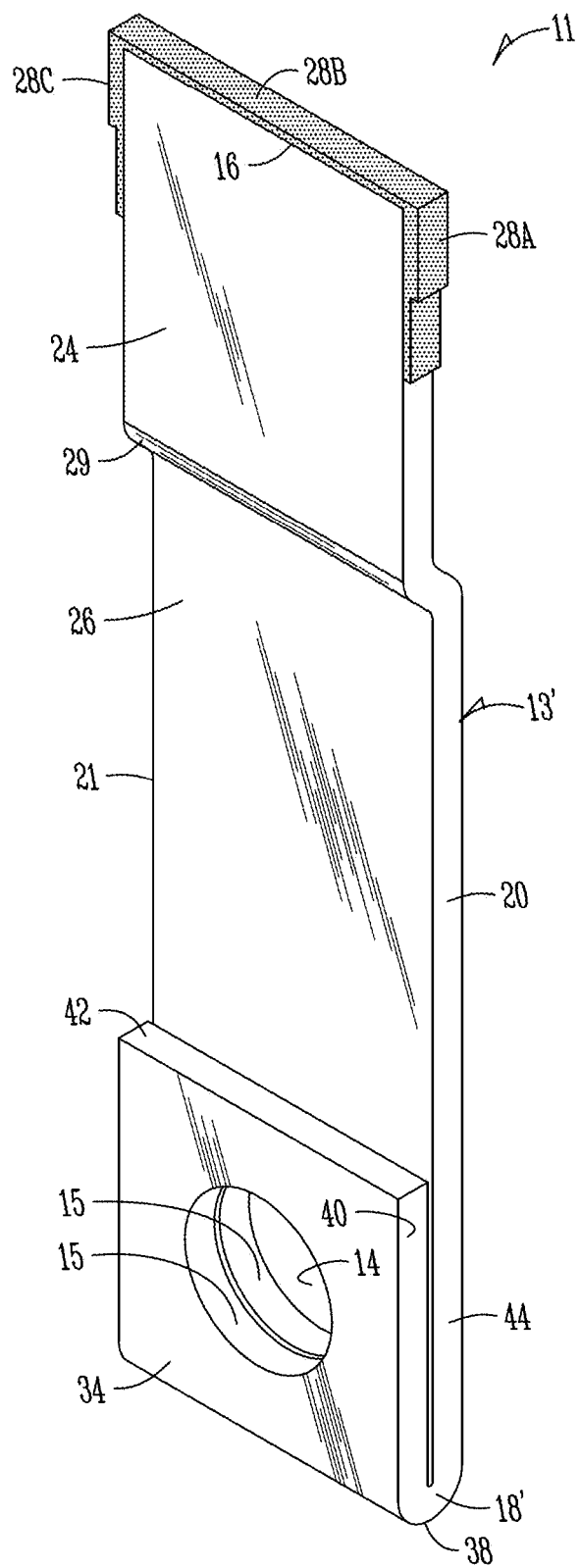
FIG. 44 provides a top perspective view of an additional alternative improved hammer that includes a U-shaped proximate end which may have been formed as a result of a hot-working process.
Figure 45:
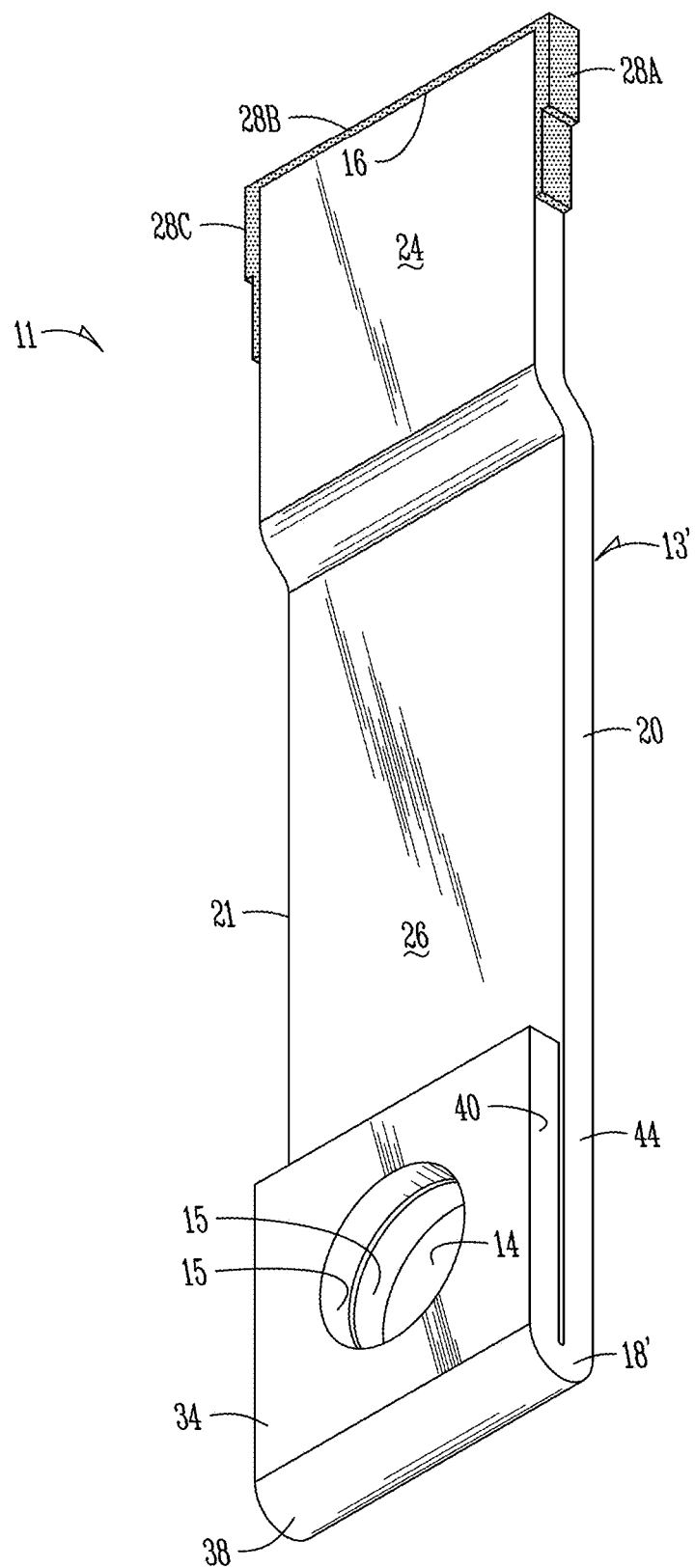
FIG. 45 provides a bottom perspective view of the alternative improved hammer of FIG. 44.
Figures 46, 47, 48, 49:
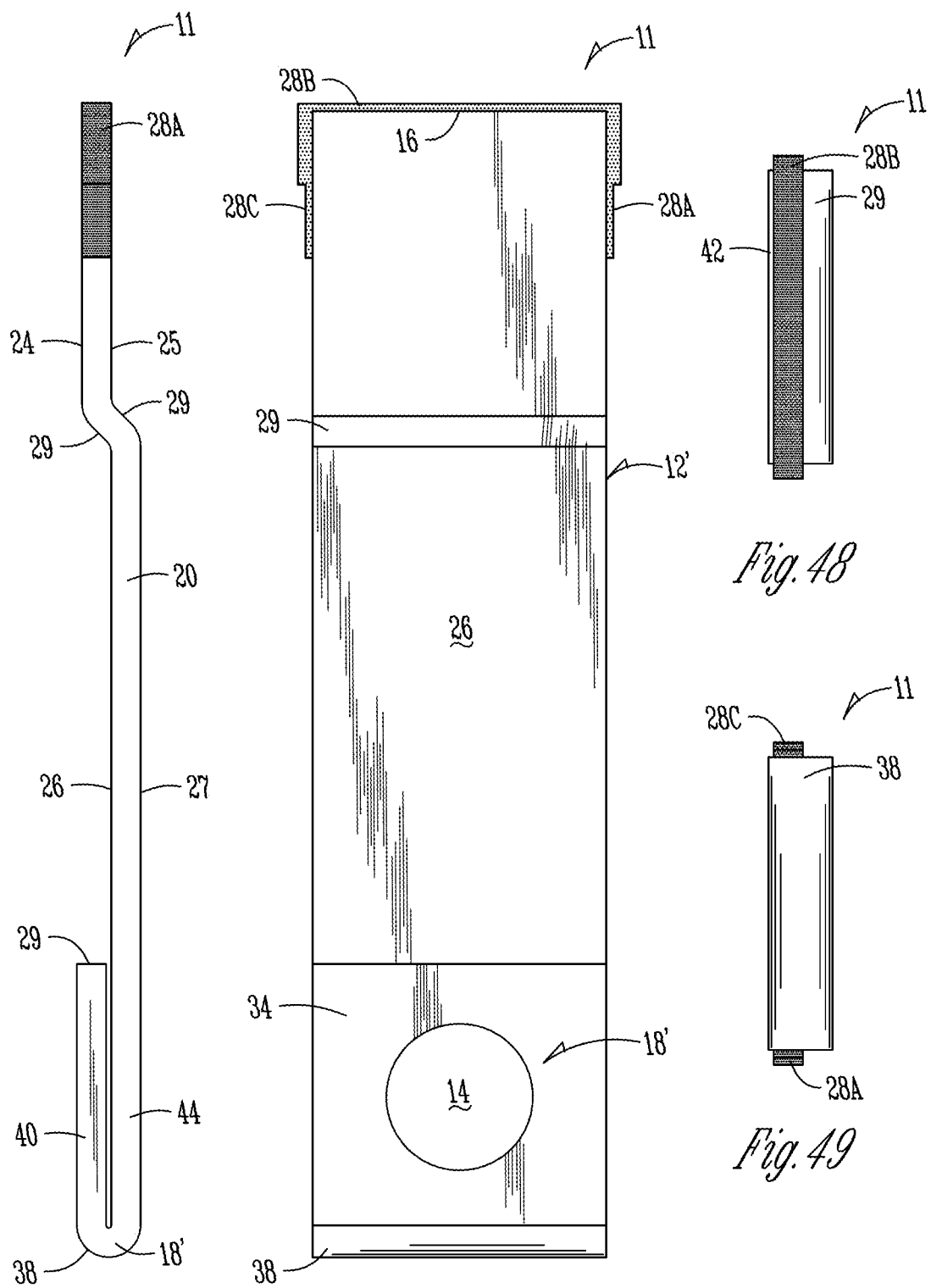
FIG. 46 provides a side elevation view of the alternative improved hammer of FIG. 44.
FIG. 47 provides a front elevation view of the alternative improved hammer of FIG. 44.
FIG. 48 provides a top elevation view of the alternative improved hammer of FIG. 44.
FIG. 49 provides a bottom elevation view of the alternative improved hammer of FIG. 44.
Figure 50:
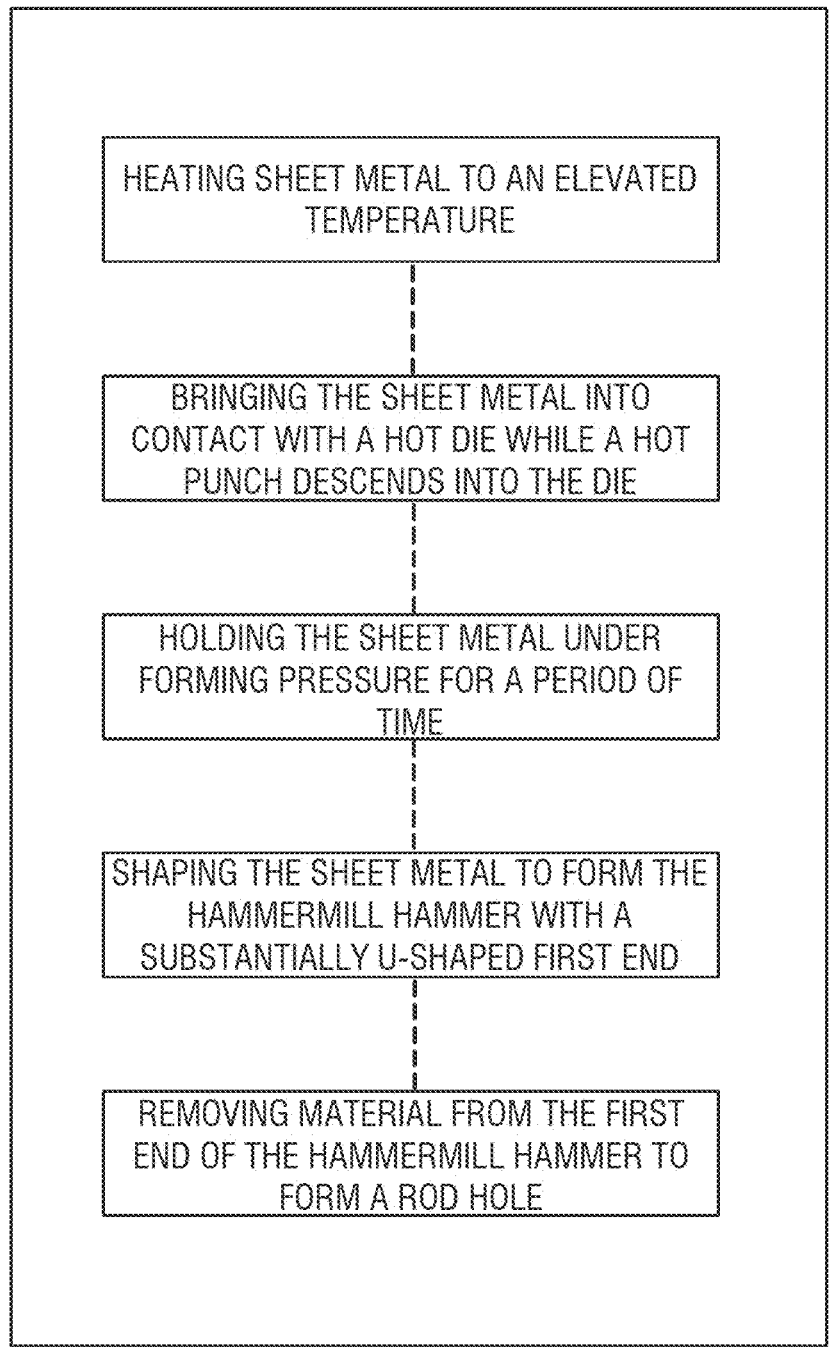
FIG. 50 shows a flow chart depicting a manufacturing process for a hammermill hammer.
Figure 51:
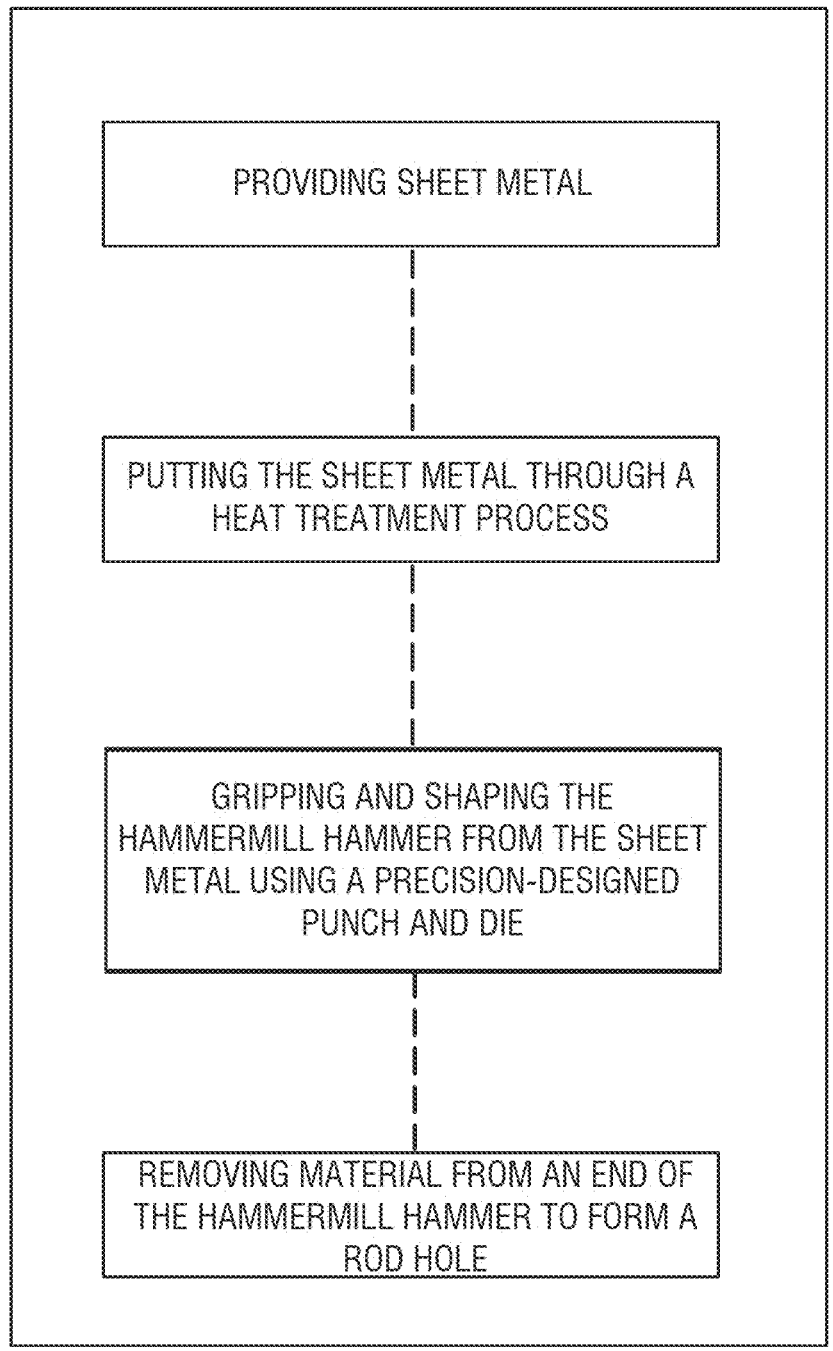
FIG. 51 shows a flow chart depicting another manufacturing process for a hammermill hammer.

Additional welds may be included, but are not required, where hammer bodies 12, 13 meet other hammer bodies 12, 13. For example, with respect to the embodiment shown in FIGS. 26-37, these welds 22 could be located near the center of hammer bodies 12, 13, and could potentially span up to the width of three hammer body side edges 20, 21. These welds could also be located at the top and bottom of hammer bodies 12, 13 if the hammer bodies 12, 13 abut one another near where the hammer bodies secure to hammer mouth 52, as is shown in FIGS. 29-31 and 35-37. In such a scenario, the hammer mouth 52 will have to be configured such that the distance between some of the teeth 76, 78 is increased so that at least two hammer bodies may be secured between two teeth. Furthermore, the welds 22 that would have been associated with these hammer bodies may be replaced by a single weld 23 of increased width so that the weld can span the width of both of the hammer body edges 20, 21 between first teeth 176C, 176D, as is shown in FIGS. 29-31, or between first teeth 376B, 376C, 376D, as is shown in FIGS. 35-37. Similarly, another weld 23 of increased width may be used on second teeth shaped edge 55 (not shown) between second teeth 178C, 178D, as would be the case in FIGS. 29-31, or between first teeth 376B, 376C, 376D, as would be the case in FIGS. 35-37.

FIGS. 26-31 show two configurations of hammer assemblies 50, 150 that can secure six total hammers 10, 11 in two separate trident shaped configurations 48. FIGS. 32-37 show two configurations of hammer assemblies 250, 350 that can secure six total hammers 10, 11 in three separate pitchfork shaped configurations 49.

The present disclosure is not limited to this arrangement of hammer bodies 12, 13 or to the way in which hammer bodies 13 are shown to be oriented. Furthermore, any number and any pattern of hammer bodies 12, 13 may be used, including patterns that simply change the orientation of some of the hammer bodies 13, but would otherwise be identical. The patterns shown in FIGS. 26-37 are for exemplary purposes.

In the embodiment shown FIGS. 26-28, first teeth shaped surface 54 has seven first teeth 76A-G, which extend away from bottom surface or base 70. Similarly, second teeth shaped surface 55 has seven second teeth 78A-G positioned opposite first teeth 76A-G. First teeth 76A-G have first crown edges 72A-G and second teeth 78A-G have second crown edges 74A-G. First and second crown edges 72A-G, 74A-G are interrupted by root edges 58A-G. Crown edges 72A-G, 74A-G are generally parallel to bottom surface or base 70. As was stated previously, hammer mouth 52 is configured to secure six total hammers 10, 11 in two separate trident shaped configurations 48.

FIGS. 29-31 show an improved, non-forged hammer assembly 150 to be installed in a hammermill assembly using hammers 10, 11. However, the configuration of the hammer mouth 152 differs from the configuration of the hammer mouth 52 shown in FIGS. 26-28 because hammer mouth 152 includes one less tooth on each side and now comprises first and second teeth 176A-F, 178A-F. As is shown, the middle tooth has been removed such that the two central non-planar hammer bodies 13 now abut one another at their distal and proximal ends 16, 18. The welds 22 that would have been associated with these hammer bodies may be replaced by a single weld 23 of increased width so that the weld can span the width of both of the hammer body edges 20, 21 between first teeth 176C, 176D, as is shown. Similarly, another weld 23 of increased width may be used on second teeth shaped edge 155 (not shown) between second teeth 178C, 178D.

Figure 32:
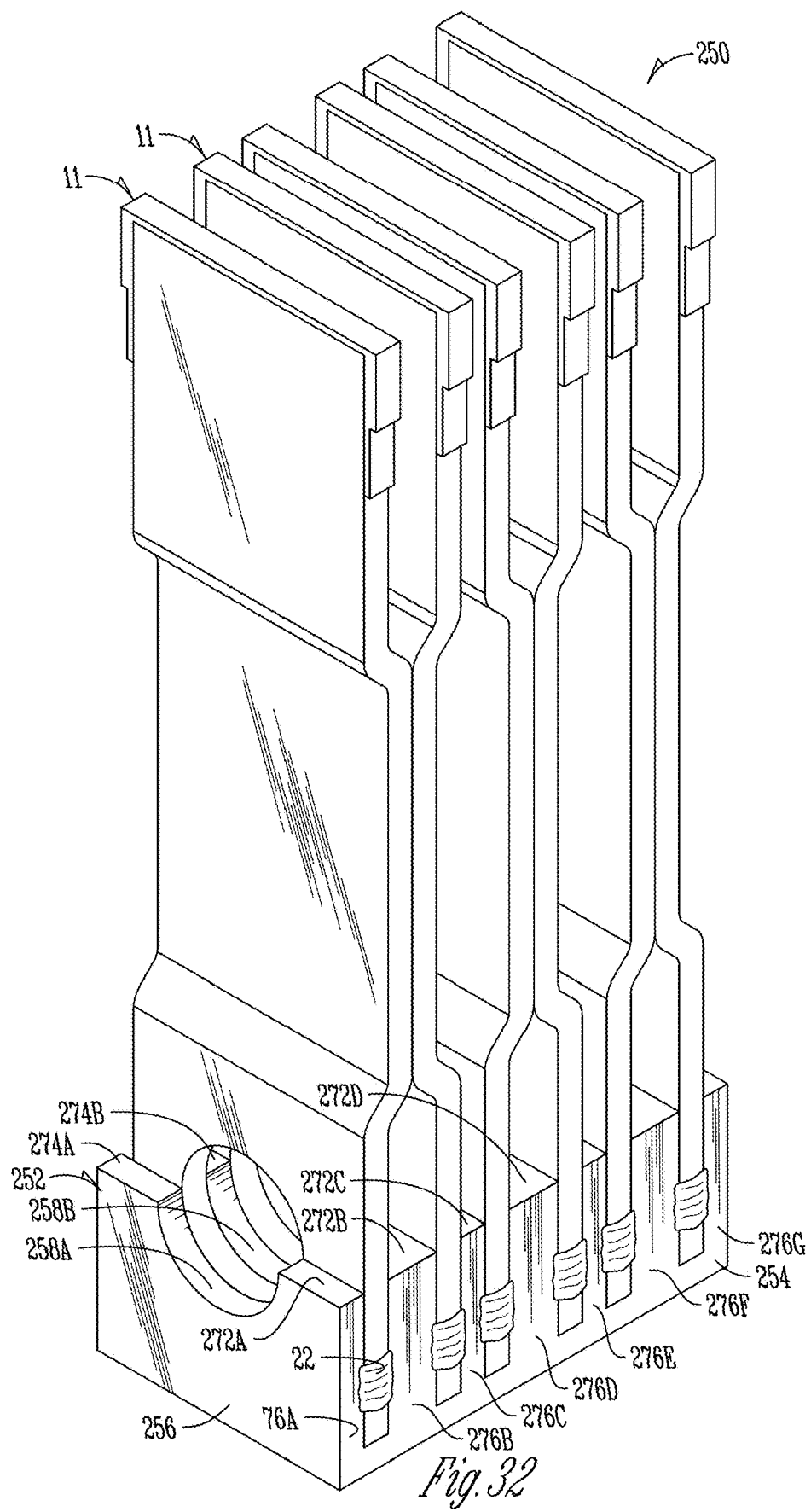
FIG. 32 provides a perspective view of a hammer assembly that implements several hammers of FIG. 20.
Figures 33, 34:
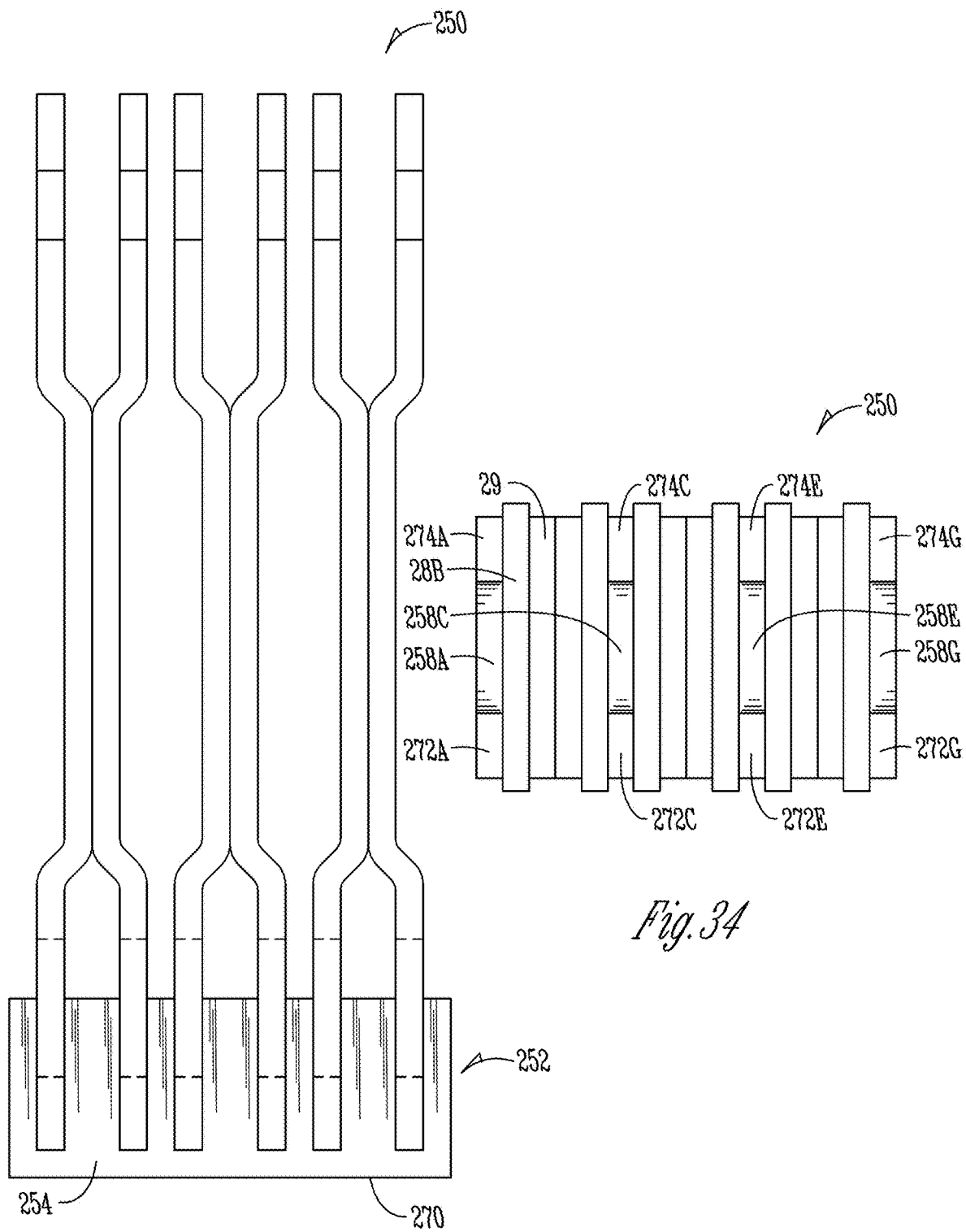
FIG. 33 provides a side view of the improved hammer assembly of FIG. 32.
FIG. 34 provides a top view of the improved hammer assembly of FIG. 32.

In the embodiment shown FIGS. 32-34, first teeth shaped surface 254 has seven first teeth 276A-G, which extend away from bottom surface or base 270. Similarly, second teeth shaped surface 255 has seven second teeth 278A-G positioned opposite first teeth 276A-G. Every other tooth 276B, 276D, 276F, 278B, 278D, 278F in the hammer mouth 252 of FIGS. 32-34 is of increased width. Preferably, although the present disclosure is not limited to such, every other tooth 276B, 276D, 276F, 278B, 278D, 278F increases by the width of the first and second edges 20, 21 of the non-planar hammer bodies 13. First teeth 276A-G have first crown edges 272A-G and second teeth 278A-G have second crown edges 274A-G. First and second crown edges 272A-G, 274A-G are interrupted by root edges 258A-G. Crown edges 272A-G, 274A-G are generally parallel to bottom surface or base 270. As was stated previously, hammer mouth 252 is configured to secure six total non-planar hammers 11 in two separate pitchfork shaped configurations 49.

FIGS. 35-37 show an improved, non-forged hammer assembly 350 to be installed in a hammermill assembly using non-planar hammers 11. However, the configuration of the hammer mouth 352 differs from the configuration of the hammer mouth shown in FIGS. 32-34 because hammer mouth 352 includes two less teeth on each side and now comprises first and second teeth 376A-E, 378A-E. As is shown, the smaller middle teeth have been removed such that the second and third non-planar hammer bodies 13 and fourth and fifth non-planar hammer bodies 13 now abut one another at their distal and proximal ends 16, 18. The welds 22 that would have been associated with these hammer bodies may be replaced by a single weld 23 of increased width so that the weld can span the width of both of the hammer body edges 20, 21 between first teeth 376B, 376C and between first teeth 376C, 376D, as is shown. Similarly, more welds 23 of increased width may be used on second teeth shaped edge 355 (not shown) between second teeth 376B, 376C, and between second teeth 376C, 378D.

Exemplary Processes Employed During the Manufacture Hammermill Hammer(s)

MIG Welding and MIG Tungsten Carbide Embedding in General:

MIG welding is an arc welding process in which a continuous solid wire electrode is fed through a welding gun and into the weld pool, joining the two base materials together. A shielding gas is also sent through the welding gun and protects the weld pool from contamination. MIG welding is a subtype of gas metal arc welding (GMAW).

MIG tungsten carbide embedding is a welding process that deposits extremely hard tungsten carbide particles (70 Rc) in the weld puddle of a hardfacing wire as it is applied. MIG tungsten carbide incorporates intact tungsten carbide particles for maximum abrasion resistance, is more abrasion resistant than chromium carbide, is easy and economical to apply, provides wear life compared to typical hardfacing wires, and may be used in extreme abrasion environments.

For example, for severe abrasion applications, the PostalloyPS98 Tool Steel Matrix Wire may be used to assist MIG carbide embedding. The PostalloyPS98 Tool Steel Matrix Wire consists of a vibratory feeder and a standard semi-automatic MIG gun, that delivers metered tungsten carbide particles to a molten weld pool at precisely the right moment prior to the puddle freezing. The result is a weld deposit filled with Tungsten Carbide surrounded in a 58 Rc tool steel matrix.

While chromium carbide has served industry adequately for many years, more recent production demands on parts and equipment have dictated a harder, more wear resistant solution. MIG carbide embedding with PS-98 offers two to eight times better wear life than typical hardfacing alloys and can be deposited at one-third the cost of tungsten carbide hardfacing wires.

Typical equipment that can benefit from MIG carbiding are mining and construction equipment, dredging equipment, mixing, blending, shredding and processing equipment, drill bit and equipment, agricultural parts.

The present disclosure contemplates MIG tungsten carbide embedding can also be used to improve the effectiveness of depositing extremely hard tungsten carbide particles onto the hammermill hammer 10/11. Using the process of MIG tungsten carbide embedding is especially advantageous for creating improved hammermill hammers because of the high abrasion environments the hammermill hammers are subjected to. Typically, hammermill machines employing hammers of this type are operated twenty-four hours a day, seven days a week. This punishing environment requires strong and resilient material that will not prematurely or unexpectedly deteriorate.

Safety Precautions:

It should be noted that human welders should observe proper safety precautions before using the MIG tungsten carbide embedding process disclosed herein. Welders should make sure they have the proper safety apparel and that any potential fire hazards are removed from the welding area. Basic welding safety apparel includes but is not limited to leather shoes or boots, cuff-less full-length pants, a flame-resistant, long sleeve jacket, leather gloves, a welding helmet, safety glasses and a bandana or "skull cap" to protect the top of the welder's head from sparks and spatter.

Equipment:

To perform gas metal arc welding, the basic necessary equipment is a welding gun, a wire feed unit, a welding power supply, a welding electrode wire, and a shielding gas supply.

The typical gas metal arc welding gun has a number of key parts—a control switch, a contact tip, a power cable, a gas nozzle, an electrode conduit and liner, and a gas hose. The control switch, or trigger, when pressed by the welder, initiates the wire feed, electric power, and the shielding gas flow, causing an electric arc to be struck. The contact tip, normally made of copper and sometimes chemically treated to reduce spatter, is connected to the welding power source through the power cable and transmits the electrical energy to the electrode while directing it to the weld area. It must be firmly secured and properly sized, since it must allow the electrode to pass while maintaining electrical contact. On the way to the contact tip, the wire is protected and guided by the electrode conduit and liner, which help prevent buckling and maintain an uninterrupted wire feed. The gas nozzle directs the shielding gas evenly into the welding zone. Inconsistent flow may not adequately protect the weld area. Larger nozzles provide greater shielding gas flow, which is useful for high current welding operations that develop a larger molten weld pool. A gas hose from the tanks of shielding gas supplies the gas to the nozzle. Sometimes, a water hose is also built into the welding gun, cooling the gun in high heat operations.

The wire feed unit supplies the electrode to the work, driving it through the conduit and on to the contact tip. Most models provide the wire at a constant feed rate, but more advanced machines can vary the feed rate in response to the arc length and voltage. Some wire feeders can reach feed rates as high as 1200 inches per minute, but feed rates for semiautomatic gas metal arc welding typically range from 75-400 inches per minute.

Most applications of gas metal arc welding use a constant voltage power supply. As a result, any change in arc length (which is directly related to voltage) results in a large change in heat input and current. A shorter arc length causes a much greater heat input, which makes the wire electrode melt more quickly and thereby restore the original arc length. This helps operators keep the arc length consistent even when manually welding with hand-held welding guns. To achieve a similar effect, sometimes a constant current power source is used in combination with an arc voltage-controlled wire feed unit. In this case, a change in arc length makes the wire feed rate adjust to maintain a relatively constant arc length. In rare circumstances, a constant current power source and a constant wire feed rate unit might be coupled, especially for the welding of metals with high thermal conductivities, such as aluminum. This grants the operator additional control over the heat input into the weld, but requires significant skill to perform successfully. The present disclosure contemplates additional power supplies with varying known functions or advantages may be used in conjunction with or in lieu of the power supply described above to meet the needs of the individual welder or the specific weld to be performed.

Alternating current is rarely used with gas metal arc welding; instead, direct current is employed and the electrode is generally positively charged. Since the anode tends to have a greater heat concentration, this results in faster melting of the feed wire, which increases weld penetration and welding speed. The polarity can be reversed only when special emissive-coated electrode wires are used, but since these are not popular, a negatively charged electrode is rarely employed.

Electrode selection is based primarily on the composition of the metal being welded, the process variation being used, hammer design and the material surface conditions. Electrode selection greatly influences the mechanical properties of the weld and is a key factor of weld quality. In general, the finished weld metal should have mechanical properties similar to those of the base material with no defects such as discontinuities, entrained contaminants or porosity within the weld. To achieve these goals a wide variety of electrodes exist. All commercially available electrodes contain deoxidizing metals such as silicon, manganese, titanium and aluminum in small percentages to help prevent oxygen porosity. Some contain denitriding metals such as titanium and zirconium to avoid nitrogen porosity. Depending on the process variation and base material being welded the diameters of the electrodes used in gas metal arc welding typically range from 0.7 to 2.4 millimeters (0.028-0.095 inches) but can be as large as 4 millimeters (0.16 inches). The smallest electrodes, generally up to 1.14 millimeters (0.045 inches) are associated with the short-circuiting metal transfer process, while the most common spray-transfer process mode electrodes are usually at least 0.9 millimeters (0.035 inches).

Shielding gases are necessary for gas metal arc welding to protect the welding area from atmospheric gases such as nitrogen and oxygen, which can cause fusion defects, porosity, and weld metal embrittlement if they come in contact with the electrode, the arc, or the welding metal. This problem is common to all arc welding processes; for example, in the older shielded-metal arc welding process, the electrode is coated with a solid flux which evolves a protective cloud of carbon dioxide when melted by the arc. In gas metal arc welding, however, the electrode wire does not have a flux coating, and a separate shielding gas is employed to protect the weld. This eliminates slag, the hard residue from the flux that builds up after welding and must be chipped off to reveal the completed weld.

Metal Preparation:

Unlike stick and flux-cored electrodes, which have higher amounts of special additives, the solid MIG wire does not combat rust, dirt, oil or other contaminants very well. Thus, it may be necessary to use a metal brush or grinder, clean down to bare metal before striking an arc, and connect any work clamps to clean metal to reduce the risk of any electrical impedance affecting wire feeding performance before starting the welding process. To ensure strong welds on thicker metal, it may be desirable to bevel the hammer to ensure the weld fully penetrates to the base metal.

Equipment Preparation:

Before striking an arc, the welder should check the welder's cables to make sure all of the cable connections are tight fitting and free of fraying or other damage.

Additionally, the welder should select the electrode polarity. MIG welding requires DC electrode positive, or reverse polarity. The polarity connections are usually found on the inside of the machine.

Additionally, the welder should set the gas flow after turning on the shielding gas. The desirable rate of shielding-gas flow depends primarily on weld geometry, speed, current, the type of gas, and the metal transfer mode. Welding flat surfaces requires higher flow than welding grooved materials, since gas disperses more quickly. Faster welding speeds, in general, mean that more gas must be supplied to provide adequate coverage. Additionally, higher current requires greater flow, and generally, more helium is required to provide adequate coverage than if argon is used. Perhaps most importantly, the four primary variations of gas metal arc welding have differing shielding gas flow requirements—for the small weld pools of the short circuiting and pulsed spray modes, about 20 to 25 cubic feet per hour is generally suitable, whereas for globular transfer, around 30 feet per cubic hour is preferred. The spray transfer variation normally requires more shielding-gas flow because of its higher heat input and thus larger weld pool. Typical gas-flow amounts are approximately 40 to 50 cubic feet per hour. If the welder suspects leaks in the gas hose, the welder should apply a soapy water solution and look for bubbles. If a leak is spotted, the hose should be discarded and a new hose should be installed.

Additionally, the welder should check tension in the drive rolls and the wire spool hub. Too much or too little tension on either the drive rolls or the wire spool hub can lead to poor wire feeding performance. The welder should adjust the tension according to owner's manual.

Additionally, the welder should check consumables, in case they have been consumed by previous welds. It may then be desired to remove excess spatter from contact tubes, replace worn contact tips and liners, and discard the wire if it appears rusty.

Wire Selection:

For steel, there are two common wire types. It may be preferred to use an AWS classification ER70S-3 for all-purpose welding. It may be preferred to use an ER70S-6 wire when more deoxidizers are needed for welding on dirty or rusty steel. As for the wire diameter, it may be preferred to use a 0.030-inch diameter makes a good all-around choice for welding the hammer. For welding thinner hammer, a 0.023-inch wire may be used to reduce heat input. For welding thicker hammers at higher total heat levels, a 0.035-inch wire may be used.

Stick-out is the length of unmelted electrode extending from the tip of the contact tube, and it does not include arc length. The ideal stick-out will create a "sizzling" sound during operation. This may occur at ⅜ inches, but if the arc sounds irregular, the welder could adjust the length of the stick-out.

It may also be necessary to select the voltage level and wire feed speed to be used during the welding process. How much voltage and amperage a weld requires depends on numerous variables, including metal thicknesses, type of metal, hammer configuration, welding position, shielding gas and wire diameter speed (among others). Some wire feed systems have a convenient reference chart located on the inside of the door housing. Other wire feed systems are automated and depend on the wire diameter being used and the thickness of hammer to be welded. The welder may then selectively fine-tune the welding arc to the welder's personal preferences.

Gas Selection:

The choice of a shielding gas depends on several factors, most importantly: the type of material being welded, and the process variation being used. Pure inert gases such as argon and helium are only used for nonferrous welding; with steel they do not provide adequate weld penetration (argon) or cause an erratic arc and encourage spatter (with helium). Pure carbon dioxide, on the other hand, allows for deep penetration welds but encourages oxide formation, which adversely affect the mechanical properties of the weld. Its low cost makes it an attractive choice, but because of the reactivity of the arc plasma, spatter is unavoidable and welding thin materials is difficult. As a result, argon and carbon dioxide are frequently mixed in a 75 percent argon/25 percent CO2 blend (also called "75/25" or "C25") to 90 percent argon/25 percent CO2 blend. C25 may work as the best "all purpose" shielding gas for carbon steel. Generally, in short circuit gas metal arc welding, higher carbon dioxide content increases the weld heat and energy when all other weld parameters (volts, current, electrode type and diameter) are held the same. As the carbon dioxide content increases over 20%, spray transfer gas metal arc welding becomes increasingly problematic, especially with smaller electrode diameters.

Argon is also commonly mixed with other gases, oxygen, helium, hydrogen and nitrogen. The addition of up to 5% oxygen (like the higher concentrations of carbon dioxide mentioned above) can be helpful in welding stainless steel, however, in most applications carbon dioxide is preferred. Increased oxygen makes the shielding gas oxidize the electrode, which can lead to porosity in the deposit if the electrode does not contain sufficient deoxidizers. Excessive oxygen, especially when used in application for which it is not prescribed, can lead to brittleness in the heat affected zone. Argon-helium mixtures are extremely inert, and can be used on nonferrous materials. A helium concentration of 50-75% raises the required voltage and increases the heat in the arc, due to helium's higher ionization temperature. Hydrogen is sometimes added to argon in small concentrations (up to about 5%) for welding nickel and thick stainless-steel workpieces. In higher concentrations (up to 25% hydrogen), it may be used for welding conductive materials such as copper. However, it should not be used on steel, aluminum or magnesium because it can cause porosity and hydrogen embrittlement.

Shielding gas mixtures of three or more gases are also available. Mixtures of argon, carbon dioxide and oxygen are marketed for welding steels. Other mixtures add a small amount of helium to argon-oxygen combinations, these mixtures are claimed to allow higher arc voltages and welding speed. Helium also sometimes serves as the base gas, with small amounts of argon and carbon dioxide added. However, because it is less dense than air, helium is less effective at shielding the weld than argon—which is denser than air. It also can lead to arc stability and penetration issues, and increased spatter, due to its much more energetic arc plasma. Helium is also substantially more expensive than other shielding gases. Other specialized and often proprietary gas mixtures claim even greater benefits for specific applications.

The Welding Process:

A human welder may utilize the push or forehand technique which involves pushing the gun away from (ahead of) the weld puddle. Pushing usually produces lower penetration and a wider, flatter bead because the arc force is directed away from the weld puddle. Pushing usually offers a better view and enables you to better direct wire into the hammer. A welder may also utilize the drag or backhand technique (also called the, pull or trailing technique) where the welding gun is pointed back at the weld puddle and dragged away from the deposited metal. Dragging typically produces deeper penetration and a narrower bead with more buildup.

Travel angle is defined as the angle relative to the gun in a perpendicular position. Normal welding conditions in all positions call for a travel angle of 5 to 15 degrees. Travel angles beyond 20 to 25 degrees can lead to more spatter, less penetration and general arc instability. Work angle is the gun position relative to the angle of the hammer, and it varies with each welding position and hammer configuration. For example, a welder may weld from a flat position, a horizontal position, a vertical position, an overhead position, etc. With respect to welding carbide onto the hammer, a welder may find it is easiest to weld from a flat or horizontal position. When welding from a horizontal position, the welder may have to adjust the gun angle by up to 15 degrees to account for the effects of gravity.

The present disclosure contemplates that the welding process may also be substantially automated such that a human welder is not necessary for more than providing inputs to an automated system or for supervisory purposes. Using automated systems to handle the workpieces and the welding gun can speed up the manufacturing process such that carbide can be quickly embedded in a plurality of hammermill hammers on an assembly line.

Location of the Weld:

Carbide, and preferably tungsten carbide, may be welded the periphery of the hammermill hammer (also known as contact edges) on the end of the hammer that is located away from where the hammer attaches to the hammermill rod. The weld may be applied any or all of the contact edges. For example, in one embodiment, the weld is applied only to the leading edge of the hammermill hammer. The weld may cover a portion of the front and rear surfaces of the hammermill hammer as well. The portion of tungsten carbide to be welded or hardfaced to the front and rear portions of the hammermill hammer may also take any known shape, style, or pattern, such as triangular, rectangular, trapezoidal, semi-circular, "corner-capping," u-shaped, or any combination thereof.

Carbide may also be welded in a butt weld configuration (180-degree joint) on both edges of the hammer body where the hammer body and hammer saddle meet. The welds may span the entire with of side u-shaped edges of the hammer saddle or may be less than the total.

Cold Forming:

Cold forming is the process by which a component is formed using a press tool made up of a punch, die and grip ring. The material is first put through an approved heat treatment process, then it is gripped and shaped using a precision-designed punch and die. Approved heat treatments are also used to relieve stress after forming.

Cold forming may also be referred to as work hardening or strain hardening and is a process for strengthening a metal or polymer by plastic deformation. This strengthening occurs because of dislocation movements and dislocation generation within the crystal structure of the material. Many non-brittle metals with a reasonably high melting point as well as several polymers can be strengthened in this fashion. Certain alloys are more prone to this than others. Alloys not amenable to heat treatment, including low-carbon steel, pure copper, and aluminum, are often work-hardened. Some materials cannot be work-hardened at low temperatures, such as indium.

The cold forming process is characterized by shaping the workpiece at a temperature below its recrystallization temperature, usually at ambient temperature. Cold forming techniques are usually classified into four major groups: squeezing, bending, drawing, and shearing. Applications include the heading of bolts and cap screws and the finishing of cold rolled steel. In cold forming, metal is formed at high speed and high pressure using tool steel or carbide dies. The cold working of the metal increases the hardness, yield strength, and tensile strength.

Cold forming provides a number of advantages over other forming methods including hot forming, superplastic forming etc. For example, cold forming is much faster than hot forming or superplastic forming, and hence is appropriate for higher volume production. Relatively complex shapes can be formed by careful tool design. High surface profile tolerances due to uninterrupted grain orientation in work formed metals, giving increased tensile strength. Finally, cold forming typically costs less than hot forming, superplastic forming, and machining from a solid.

It is to be appreciated cold forming may be used in particular during the manufacturing process to shape the improved hammers 10, 11 of the present disclosure. For example, the recessed and protruding surfaces 26, 27 may be formed by providing a piece of sheet metal, putting the sheet metal through an approved heat treatment process, and gripping and shaping the hammer using a precision-designed punch and die.

Hot Forming:

In hot forming processes, metals are plastically deformed above their recrystallization temperature. Being above the recrystallization temperature allows the material to recrystallize during deformation. This is important because recrystallization keeps the materials from strain hardening, which ultimately keeps the yield strength and hardness low and ductility high. Hot forming processes include rolling, forging, extrusion, and drawing.

The lower limit of the hot working temperature is determined by its recrystallization temperature. As a guideline, the lower limit of the hot working temperature of a material is 60% its melting temperature (on an absolute temperature scale). The upper limit for hot working is determined by various factors, such as: excessive oxidation, grain growth, or an undesirable phase transformation. In practice materials are usually heated to the upper limit first to keep forming forces as low as possible and to maximize the amount of time available to hot work the workpiece.

The most important aspect of any hot working process is controlling the temperature of the workpiece. 90% of the energy imparted into the workpiece is converted into heat. Therefore, if the deformation process is quick enough the temperature of the workpiece should rise, however, this does not usually happen in practice. Most of the heat is lost through the surface of the workpiece into the cooler tooling. This causes temperature gradients in the workpiece, usually due to non-uniform cross-sections where the thinner sections are cooler than the thicker sections. Ultimately, this can lead to cracking in the cooler, less ductile surfaces. One way to minimize the problem is to heat the tooling. The hotter the tooling the less heat lost to it, but as the tooling temperature rises, the tool life decreases. Therefore, the tooling temperature must be compromised.

Advantages of using hot forming processes include a decrease in yield strength, (therefore it is easier to work and uses less energy or force), an increase in ductility, elevated temperatures increase diffusion which can remove or reduce chemical inhomogeneities, pores may reduce in size or close completely during deformation, and in steel, the weak, ductile, face-centered-cubic austenite microstructure is deformed instead of the strong body-centered-cubic ferrite microstructure found at lower temperatures.

Usually the initial workpiece that is hot worked was originally cast. The microstructure of cast items does not optimize the engineering properties, from a microstructure standpoint. Hot working improves the engineering properties of the workpiece because it replaces the microstructure with one that has fine spherical shaped grains. These grains increase the strength, ductility, and toughness of the material.

The engineering properties can also be improved by reorienting the inclusions (impurities). In the cast state the inclusions are randomly oriented, which, when intersecting the surface, can be a propagation point for cracks. When the material is hot worked the inclusions tend to flow with the contour of the surface, creating stringers. As a whole the strings create a flow structure, where the properties are anisotropic (different based on direction). With the stringers oriented parallel to the surface it strengthens the workpiece, especially with respect to fracturing. The stringers act as "crack-arrestors" because the crack will want to propagate through the stringer and not along it.

In a preferred embodiment, the hammers 10, 11 of the present disclosure comprise high-carbon steel and a hot-forming process is used to shape any portions of the improved hammers 10, 11 that may be difficult to form through a cold working process or some other type of manufacturing process. Furthermore, it is to be appreciated hot-forming process may be used to shape any of the surfaces of the hammers, and that the surfaces (or at least portions of the surfaces) of the hammers may take any known two-dimensional shape, such as ovals (including ellipses, circles, etc.), partial ellipses (including semi-circles), stadiums, regular polygons (including triangles, rectangles, etc.), irregular polygons, cones, shapes of letters or numbers, curves extruded in two dimensions, or a combination of any of the preceding two-dimensional shapes. For example, FIGS. 38-49 show alternative hot formed hammer bodies 12', 13' which include a U-shaped proximate end 18' formed as a result of a hot working process. The U-shaped proximate end 18' is provided in lieu of the proximate end 18 disclosed above. In particular, the U-shaped proximate end 18' helps appropriately space adjacent hammers 10, 11 when the hammers 10,11 are assembled onto a hammermill rod.

Final Matters:

The foregoing description has been presented for purposes of illustration and description and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A method of manufacturing a hammermill hammer comprising:
   heating sheet metal an elevated temperature;
   bringing the sheet metal into contact with a hot die while a hot punch descends into the die;
   holding the sheet metal under forming pressure for a period of time;
   shaping the sheet metal to form the hammermill hammer with a substantially U-shaped first end; and
   removing material from the first end of the hammermill hammer to form a rod hole;
   wherein a second end of the hammermill hammer is for contact and delivery of momentum to material to be comminuted.

2. The method of claim 1 wherein the sheet metal comprises steel.

3. The method of claim 1 wherein rolling, forging, extruding, or drawing the sheet metal further shapes at least one aspect of the hammermill hammer.

4. A method of manufacturing a hammermill hammer comprising:
   providing sheet metal;
   putting the sheet metal through a heat treatment process;
   gripping and shaping the hammermill hammer from the sheet metal using a precision-designed punch and die; and
   removing material from an end of the hammermill hammer to form a rod hole.

5. The method of claim 4 wherein the sheet metal comprises steel or aluminum.

6. The method of claim 4, wherein, after gripping and shaping the hammermill hammer using the precision-designed punch and die, the hammermill hammer comprises:
   a front surface;
   a rear surface opposite the front surface;
   a recessed surface;
   a protruding surface located opposite the recessed surface;
   a first end;
   a second end for contact and delivery of momentum to material to be comminuted; and
   a rod hole for securing the hammermill hammer to a hammermill rod of a rotatable hammermill assembly.

\* \* \* \* \*